(12) United States Patent
Bohlinger et al.

(10) Patent No.: US 7,652,888 B2
(45) Date of Patent: Jan. 26, 2010

(54) CONTROLLER HOUSING WITH CONNECTOR RETENTION ASSEMBLY AND METHOD

(75) Inventors: William C. Bohlinger, Buffalo City, WI (US); Kurt W. Peterson, La Crosse, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 186 days.

(21) Appl. No.: 11/358,849

(22) Filed: Feb. 21, 2006

(65) Prior Publication Data

US 2006/0230296 A1 Oct. 12, 2006

Related U.S. Application Data

(60) Provisional application No. 60/670,078, filed on Apr. 11, 2005.

(51) Int. Cl.
*H05K 5/00* (2006.01)

(52) U.S. Cl. .................. 361/732; 361/93.1; 439/66; 439/357; 439/676

(58) Field of Classification Search .......... 361/686, 361/704, 710, 93.1, 636, 642, 732; 439/66, 439/67, 352, 357, 358, 676; 700/22; 29/428, 29/857

See application file for complete search history.

(56) References Cited

U.S. PATENT DOCUMENTS

| | | | |
|---|---|---|---|
| 2,826,388 A | 3/1958 | Janos | |
| 3,180,606 A | 4/1965 | Savin et al. | |
| 3,689,886 A | 9/1972 | Durkee | |
| 3,992,608 A | 11/1976 | Snavely | |
| 4,223,861 A | 9/1980 | Guggemos et al. | |
| 4,237,369 A | 12/1980 | Jones | |
| 4,527,760 A | 7/1985 | Salacuse | |
| 4,589,052 A | 5/1986 | Dougherty | |
| 4,751,605 A | 6/1988 | Mertz et al. | |
| 4,819,149 A | 4/1989 | Sanik et al. | |
| 4,870,531 A * | 9/1989 | Danek | 361/93.1 |
| 4,950,872 A | 8/1990 | Chen | |
| 4,991,042 A | 2/1991 | Tokarski et al. | |
| 5,096,442 A * | 3/1992 | Arnett et al. | 439/676 |
| 5,120,936 A | 6/1992 | Shyu et al. | |

(Continued)

FOREIGN PATENT DOCUMENTS

EP 0 259 005 7/1987

(Continued)

OTHER PUBLICATIONS

Centipede by Briskheat, "Individual Jacket Temperature Control for the New Millennium" http://bhthermal.com/htm/centipedeoverview.cfm.

(Continued)

*Primary Examiner*—Jayprakash N Gandhi
*Assistant Examiner*—Courtney Smith
(74) *Attorney, Agent, or Firm*—Brinks Hofer Gilson & Lione

(57) ABSTRACT

A method and a housing assembly including a case defining an opening, and a coupler positioned within the opening and configured for coupling to a connector, wherein the case defines a securing portion positioned proximate to the opening and is configured for securing a portion of the connector when coupled with the coupler.

27 Claims, 26 Drawing Sheets

U.S. PATENT DOCUMENTS

| | | | |
|---|---|---|---|
| 5,225,811 A | | 7/1993 | Audy |
| 5,342,221 A | | 8/1994 | Peterson |
| 5,430,598 A | | 7/1995 | Rodolfo et al. |
| 5,566,879 A | | 10/1996 | Longtin |
| 5,655,913 A | * | 8/1997 | Castaneda et al. ............. 439/66 |
| 5,658,480 A | | 8/1997 | Tennant et al. |
| 5,667,712 A | | 9/1997 | Sutorius et al. |
| 5,694,108 A | | 12/1997 | Shuey |
| 5,708,256 A | | 1/1998 | Montagnino et al. |
| 5,714,738 A | | 2/1998 | Hauschulz et al. |
| 5,789,722 A | | 8/1998 | Zimmerman et al. |
| 5,813,877 A | * | 9/1998 | Nakamura ................. 439/267 |
| 5,825,643 A | | 10/1998 | Dvorak et al. |
| 5,839,097 A | | 11/1998 | Klausner |
| 5,862,393 A | | 1/1999 | Davis |
| 5,897,395 A | * | 4/1999 | Arnett ........................ 439/536 |
| 5,900,179 A | | 5/1999 | Bilenko et al. |
| 5,943,201 A | | 8/1999 | Walker |
| 6,023,052 A | | 2/2000 | Carl, Jr. et al. |
| 6,027,378 A | * | 2/2000 | Abe et al. .................... 439/701 |
| 6,045,388 A | * | 4/2000 | Higgins et al. .............. 439/352 |
| 6,121,889 A | | 9/2000 | Janda et al. |
| 6,150,628 A | | 11/2000 | Smith et al. |
| 6,160,365 A | | 12/2000 | Younger et al. |
| 6,241,558 B1 | * | 6/2001 | Mosquera .................... 439/660 |
| 6,257,935 B1 | * | 7/2001 | Zhang et al. ................ 439/680 |
| 6,285,912 B1 | | 9/2001 | Ellison et al. |
| 6,289,267 B1 | | 9/2001 | Alexander et al. |
| 6,304,929 B1 | | 10/2001 | Wallach et al. |
| 6,337,635 B1 | | 1/2002 | Ericksen et al. |
| 6,350,133 B2 | * | 2/2002 | Christensen et al. .......... 439/66 |
| 6,350,156 B1 | * | 2/2002 | Hasircoglu et al. .......... 439/676 |
| 6,356,425 B1 | | 3/2002 | Jung |
| 6,406,328 B1 | | 6/2002 | Attarian et al. |
| 6,445,966 B1 | | 9/2002 | Younger et al. |
| 6,507,494 B1 | * | 1/2003 | Hutchison et al. ........... 361/704 |
| 6,522,937 B2 | | 2/2003 | Ette et al. |
| 6,547,605 B2 | * | 4/2003 | Daugherty et al. .......... 439/686 |
| 6,555,296 B2 | | 4/2003 | Jao et al. |
| 6,590,547 B2 | | 7/2003 | Moriconi et al. |
| 6,592,380 B2 | * | 7/2003 | Miyazawa et al. ............ 439/67 |
| 6,702,622 B2 | * | 3/2004 | Sato et al. .................... 439/676 |
| 6,808,427 B1 | * | 10/2004 | Xue ............................ 439/676 |
| 6,890,197 B2 | * | 5/2005 | Liebenow ................... 439/188 |
| 6,894,254 B2 | | 5/2005 | Hauschulz |
| 6,896,524 B1 | * | 5/2005 | Morello et al. ................ 439/66 |
| 6,911,809 B2 | | 6/2005 | Kernahan et al. |
| 6,960,906 B2 | | 11/2005 | Yamashita |
| 6,966,798 B1 | * | 11/2005 | Wu ............................. 439/677 |
| 7,002,328 B2 | | 2/2006 | Kernahan et al. |
| 7,049,976 B2 | | 5/2006 | Hunt et al. |
| 7,053,864 B1 | | 5/2006 | Lee |
| 7,063,554 B2 | * | 6/2006 | Kuiken et al. ............... 439/352 |
| 7,108,563 B2 | * | 9/2006 | Sato et al. .................... 439/676 |
| 2002/0025712 A1 | * | 2/2002 | Mochizuki et al. .......... 439/357 |
| 2002/0032535 A1 | | 3/2002 | Alexander et al. |
| 2002/0072265 A1 | * | 6/2002 | Chen .......................... 439/357 |
| 2002/0129186 A1 | | 9/2002 | Emerson et al. |
| 2004/0072464 A1 | * | 4/2004 | Nakamura ................... 439/352 |
| 2004/0095121 A1 | | 5/2004 | Kernahan et al. |
| 2004/0109276 A1 | | 6/2004 | Mendenhall |
| 2004/0159653 A1 | | 8/2004 | Li |
| 2004/0178683 A1 | | 9/2004 | Hermetz et al. |
| 2004/0201937 A1 | | 10/2004 | Yoshida |
| 2004/0224565 A1 | * | 11/2004 | Wan et al. ................... 439/680 |
| 2004/0227498 A1 | | 11/2004 | Okada |
| 2005/0094786 A1 | | 5/2005 | Ossa |
| 2005/0208822 A1 | * | 9/2005 | Ishigami et al. ............. 439/372 |
| 2005/0219875 A1 | | 10/2005 | Millner et al. |
| 2005/0239339 A1 | * | 10/2005 | Pepe .......................... 439/676 |
| 2005/0282442 A1 | * | 12/2005 | Hyland et al. ............... 439/676 |
| 2006/0050464 A1 | | 3/2006 | Von Arx et al. |
| 2006/0052905 A1 | | 3/2006 | Pfingsten et al. |
| 2006/0086873 A1 | | 4/2006 | Chen |
| 2006/0229740 A1 | | 10/2006 | Kreisel et al. |
| 2006/0266908 A1 | | 11/2006 | Tong |
| 2007/0238341 A1 | * | 10/2007 | So ............................. 439/172 |

FOREIGN PATENT DOCUMENTS

| | | |
|---|---|---|
| EP | 0543655 | 5/1993 |
| EP | 1176678 | 1/2002 |
| TW | 545633 | 8/2003 |
| TW | M259155 | 3/2005 |

OTHER PUBLICATIONS

Briskheat, "Plastics/Injection Molding", http://www.briskheat.com/htm/plast.cfm.

Brishheat, "Our Story", http://www.briskheat.com/htm/briskheatstory.cfm.

Briskheat, "Controllers and Sensors", http://www.briskheat.com/htm/controllers.cfm.

Briskheat, "Product Lines", http://www.briskheat.com/.

Office Action Dated Dec. 20, 2007, U.S. Appl. No. 11/358,876, pp. 1-10.

Office Action Dated May 9, 2008, U.S. Appl. No. 11/358,876, pp. 1-8.

Notification Concerning Transmittal of International Preliminary Report on Patentability Dated Oct. 25, 2007, pp. 1-11.

U.S. Patent and Trademark Office Action U.S. Appl. No. 11/358,876, Dated Oct. 18, 2007.

U.S. Patent and Trademark Office Action for U.S. Appl. No. 11/358,877, Dated Jan. 9, 2008.

U.S. Patent and Trademark Office Action for U.S. Appl. No. 11/358,877, Dated Sep. 4, 2008.

U.S. Patent and Trademark Office Action for U.S. Appl. No. 11/358,768, Dated Aug. 28, 2008.

U.S. Patent and Trademark Office Action for U.S. Appl. No. 11/358,768, Dated Jan. 10, 2008.

U.S. Patent and Trademark Office Action for U.S. Appl. No. 11/358,768, Dated Jan. 6, 2009.

Annex to the invitation to pay additional fees (Form PCT/ISA/206).

English Translation of Official Letter dated Sep. 22, 2008 from Intellectual Property Bureau Ministry of Economic Affairs for Taiwanese Patent Application No. 95112701.

U.S. Patent and Trademark Final Office Action, U.S. Appl. No. 11/358,768, Dated Jul. 1, 2009.

Chinese Office Action, Serial No. 200680018998.1, Dated Jun. 12, 2009 and English Translation.

Notification of Transmittal of the International Search Report and the Written Opinion of the International Searching Authority, or the Declaration Dated Oct. 25, 2006.

Notification of Transmittal of the International Search Report and the Written Opinion of the International Searching Authority, or the Declaration Dated Aug. 21, 2006.

Notification Concerning Transmittal of International Preliminary Report on Patentability Dated Oct. 25, 2007.

European Office Action Dated Aug. 21, 2008.

United States Office Action for U.S. Appl. No. 11/358,890, Dated Aug. 21, 2009.

Taiwan Office Action for Serial No. 95112712 Dated Sep. 16, 2009 and English Translation of Search Report.

United States Office Action for U.S. Appl. No. 11/358,768, Dated Oct. 21, 2009.

United States Office Action for U.S. Appl. No. 11/358,890, Dated Nov. 3, 2009.

* cited by examiner

US 7,652,888 B2

CONTROLLER HOUSING WITH CONNECTOR RETENTION ASSEMBLY AND METHOD

CROSS-REFERENCE TO RELATED APPLICATIONS

This application claims the benefit of U.S. Provisional Application No. 60/670,078, filed on Apr. 11, 2005. The disclosure of the above provisional application is incorporated herein by reference.

FIELD

The present invention relates to power control systems, and more specifically, the invention relates to a housing for a power controller.

BACKGROUND

The statements in this section merely provide background information related to the present disclosure and may not constitute prior art.

Generally, typical power control installations require selection of the discrete components, customized mounting and wiring for each component and feature, and numerous connections. One example of such a power control installation is a control system application for controlling the power provided to a power-receiving load where the power receiving load is a heater supplying heat to a temperature controlled manufacturing process. Any changes, additions, modifications, and replacements require disconnection and reconnection of various wire leads, yet again increasing the opportunity for problems. For example, the wire leads are often contained within wiring assemblies and terminated in wire connectors. These connectors often include a retaining clip or other retaining mechanism that are subject to premature failure when subjected to repeated connections and disconnections. The failure of the connector retention clips can result in the production system having to be halted and the failed components replaced by operating system maintenance personnel. Costly downtime and loss in process yields can result from such premature component failures. It is desirable to eliminate components that can succumb to premature failures.

The aforementioned problems and limitations of the existing power and thermal control systems and connectors are recognized by the inventors hereof and some or all of these limitations have been addressed by various embodiments of the current invention.

SUMMARY

The inventors hereof have succeeded at designing a power controller housing and method of operation wherein the power controller housing aids in the reduction and possibly the elimination of the failure of a connection between a connector connected to the power controller and the power control system.

According to one aspect of the invention, a housing assembly has a case defining an opening, and a coupler positioned within the opening and configured for coupling to a connector. The case defines a securing portion positioned proximate to the opening and is configured for securing a portion of the connector when coupled with the coupler.

According to another aspect of the invention, a power control system has a power switch for selectively providing at least a portion of power received from a power source to a power load in response to a controller including a coupler for coupling to an external connector. A housing encloses the controller and the power switch and defines a coupler opening for external access to the coupler. The housing has a biasing portion located proximate to the coupler opening for providing a biasing force to an engaging portion of a connector when the connector is coupled with the coupler. The biasing portion is configured to secure the connector in the coupled position with the coupler.

According to yet another aspect of the invention, a housing assembly has a case defining an opening, a coupler positioned within the opening and configured for coupling to a connector. The assembly includes means for securing the connector to the coupler following coupling of the connector with the coupler.

According to still another aspect of the invention, a power control system has a power switch for selectively providing at least a portion of power received from a power source to a power load in response to a controller. A coupler is configured for coupling to a connector. A housing is configured for enclosing the controller and the power switch and defining an opening. The coupler is positioned within the opening. The system includes means for securing the connector to the coupler following insertion of the connector within the opening and coupling of the connector with the coupler.

According to still another aspect of the invention, a method of operating a power controller having a housing enclosing a power switch for receiving power from a power source and selectively providing at least a portion of the received power to a power load includes inserting a connector into an opening defined by the housing enclosing the power switch and the controller, flexing a securing portion of the housing proximate to the opening during the inserting of the connector into the opening, and coupling the connector to a coupler positioned within the opening. The method also includes securing the securing portion of the housing against a locking portion of the connector following coupling of the connector to the coupler.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION

The following description is merely exemplary in nature and is in no way intended to limit the invention, this disclosure or its applications or uses.

Power Controller Operating Environment

Figure 1:
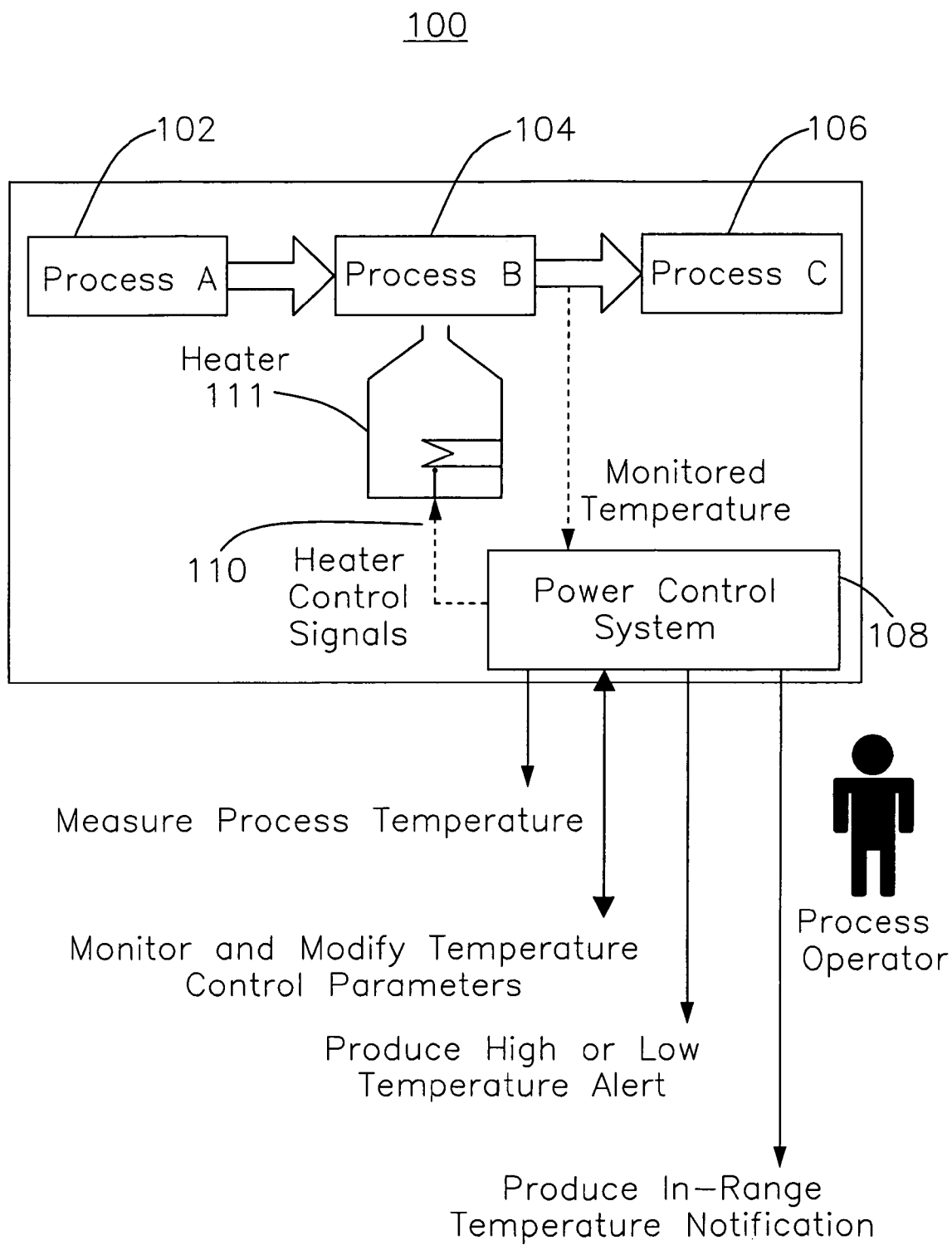
FIG. 1 is a block diagram illustrating an industrial process operating environment having a heater under the control of a power control system for monitoring and maintaining a temperature of the process according to one exemplary operating environment for some embodiments of the invention as described herein.

FIG. 1 illustrates, by way of example, a power control system environment 100 applicable with one or more of the various embodiments of the present disclosure. In FIG. 1, a thermal process includes three processes A 102, B 104 and C 106 with process B 104 requiring the heating of materials prior to proceeding to process C 106. Such an exemplary manufacturing process 100 can include, by way of example, a plastics or semiconductor manufacturing process. In this example, the temperature of process B 104 is monitored by a sensor (not shown) and the monitored temperature is provided in a sensor signal to a power controller or power control system 108. The power control system receives the monitored temperature and generates heater control signals 110, which may be in the form of power, to control a heater 111 to provide a desired temperature or temperature range for process B 104.

A human machine interface (HMI) system provides for user monitoring and user intervention to the control system 108. This can include displaying one or more operating characteristics of the control system 108 and user input mechanisms, such as keys or buttons, by way example, thereby providing the interface to the process operator for monitoring and modifying temperature control parameters. For example, in a thermal process as shown in FIG. 1, this can include inputting temperatures or set points and displaying or producing an in-range indication or a high or low temperature alert indication.

Electronic Device Mounting Assembly

In some embodiments, a bracket for mounting an electronic device in an operating environment has a mounting flange configured for attachment to a surface within the operating environment and a securing flange having a surface and one or more securing tabs offset from the surface and positioned about a periphery of the surface. The securing flange is configured for coupling to a corresponding mounting coupler attached to the electronic device with less than a full turn of the mounting coupler relative to the securing flange. An offset portion couples the mounting flange to the securing surface and defines an offset therebetween. The bracket can be configured as a unified body made of a metal or a plastic or may be assembled from a plurality of parts. The mounting flange can be relatively flat or can be curved or shaped to adapt to a particular type of mounting surface, such as having a convex curved shape for mounting to a pipe.

The mounting flange can be configured to be attached to the mounting surface by a variety of attachment or mounting fasteners and/or fastening arrangements. The mounting flange can be adapted for attachment by a strap, a cable tie, a screw, a DIN rail mount, and a bolt, by way of example. For example, the bracket can include mounting holes for attaching the bracket to a mounting surface with one or more fasteners such as a screw, a bolt, or a rivet. In other embodiments, the bracket can include a mounting sleeve for receiving a mounting strap, a cable, or a cable tie. In other embodiments, the bracket can be configured for bonding or adhesion to the mounting surface. In yet other embodiments, the bracket can be configured as an integrated portion of a mounting surface, such as a panel, a DIN rail, another electronic device housing, a pipe strap, or an external portion of another electronic device.

Additionally, the mounting flange can be adapted for mounting in any position, vertical, horizontal, upright, or upside down, or any variation thereof, for mounting an electronic device in a flexible mounting position adapted for the particular requirements of the application of the electronic device. This can be very desirable as it can enable the mounting of the electronic device in proximity to another electronic device or an operation or associated process or function. For example, a power controller providing power to a power load such as a heater, can have the bracket configured for mounting in close proximity to the heater such that the power controller can be coupled thereto and also in close proximity. Such a power controller can be configured with a housing enclosing one or more of a power switch, a controller, and a limiter configured for selectively providing power to the heater or another power load.

One or more securing tabs of the securing flange can be offset from the surface of the surface of the securing flange such as in the direction opposing the mounting flange and the offset portion. In other embodiments, one or more securing tabs may be offset in the direction towards the mounting flange. In other embodiments, the securing tabs can be formed on an outer periphery of a circular or otherwise shaped surface but in the same plane as the surface. In some embodiments, the securing tabs and the securing surface are each configured to engage a portion of a securing surface of the mounting coupler and can be configured to capture a portion of the securing surface between an offset securing tab and the surface to provide a securing engagement of the coupler securing portion of the mounting coupler.

The number of securing tabs can be of any number from one or more depending on the particular design considerations for a coupling with a mounting coupler in less than a full turn. For example, a single tab may enable a coupling turn up to nearly a full turn, whereas two securing tabs would enable a coupling turn of 180 degrees or less. In one preferred embodiment, there are three securing tabs and coupling rotation is equal to or less than about 120 degrees. In another preferred embodiment, there are four securing tabs and the coupling rotation is equal to or less than about 90 degrees. An additional preferred embodiment, would provide for a coupling rotation of less than 45 degrees. This latter embodiment, can provide for a desired or improved coupling and decoupling of an electronic device wherein the electronic device is connected to one or more wires or is mounted in a relatively tight operating space. Of course additional securing tabs can reduce the coupling rotation and are still considered to be within the scope of the present disclosure.

In some embodiments, an assembly for mounting an electronic device in an operating environment including a bracket and a coupler. The bracket has a mounting flange configured for attachment to a surface within the operating environment for mounting the electronic device, a securing flange with a surface, and a plurality of securing tabs offset from the securing flange surface and positioned about a periphery of the surface. The bracket also includes an offset portion coupling the mounting flange to the securing surface and defining an offset therebetween. The coupler is configured for coupling to the securing flange of the bracket. The securing flange of the bracket and the coupler are configured for releasably coupling with less than a full turn relative to each other.

The coupler can be configured in any shape and can be oriented as a male or female coupler to engage an appropriate female or male oriented mounting bracket. For example, the mounting bracket can be configured as having a male oriented circular securing surface and the coupler would be configured with a corresponding female oriented circular cavity for receiving the mounting bracket. The coupler can include one or more receiving channels coupled to each of the receiving cavities for channeling one of the securing tabs of the mounting bracket. In some embodiments, one or more receiving channels can have an angled surface configured for engaging one of the securing tabs when inserted and rotated within the associated receiving cavity. In this manner, upon engagement of the bracket and the coupler and a rotation of the coupler relative to the bracket, a securing tab of the bracket traverses the receiving channel and engages the angled surface to provide an inward bias to engage and secure the securing tab and therefore to secure the bracket to the coupler.

In some embodiments, the coupler is configured from a plastic or metal as a unitary body and adapted for attachment or engagement with an electronic device or the housing enclosing an electronic device. In other embodiments, the coupler can be defined or integrated within an electronic device housing such as molded into an outer surface of a plastic case or housing.

In some embodiments, a method of mounting an electronic device in an operating environment includes attaching a bracket to a surface within the operating environment, and releasably coupling a housing enclosing the electronic device to the attached bracket, the releasably coupling including a rotation of the housing relative to the attached bracket of less than a full turn. This can also include attaching the bracket with a cable tie through a mounting sleeve of the bracket and securing the cable tie about a mounting structure with the operating environment defining the surface. In other embodiments, the method can include attaching the bracket via a DIN rail attachment or attaching the bracket with one or more screws, bolts or rivets.

Figure 2:
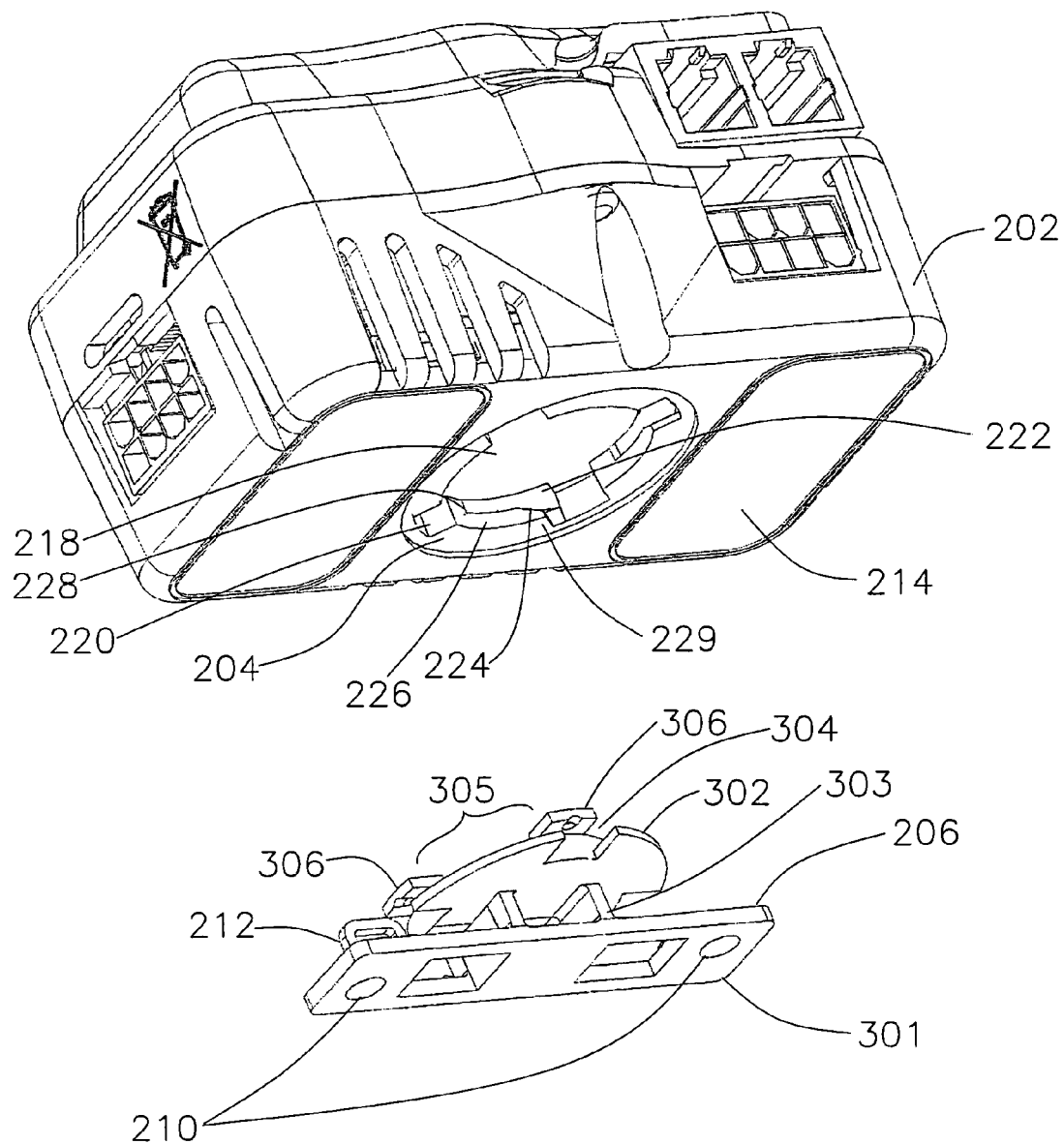
FIG. 2 is an isometric view of a mounting assembly for mounting an electrical device in an operating environment according to one exemplary embodiment of the invention.
Figure 3:
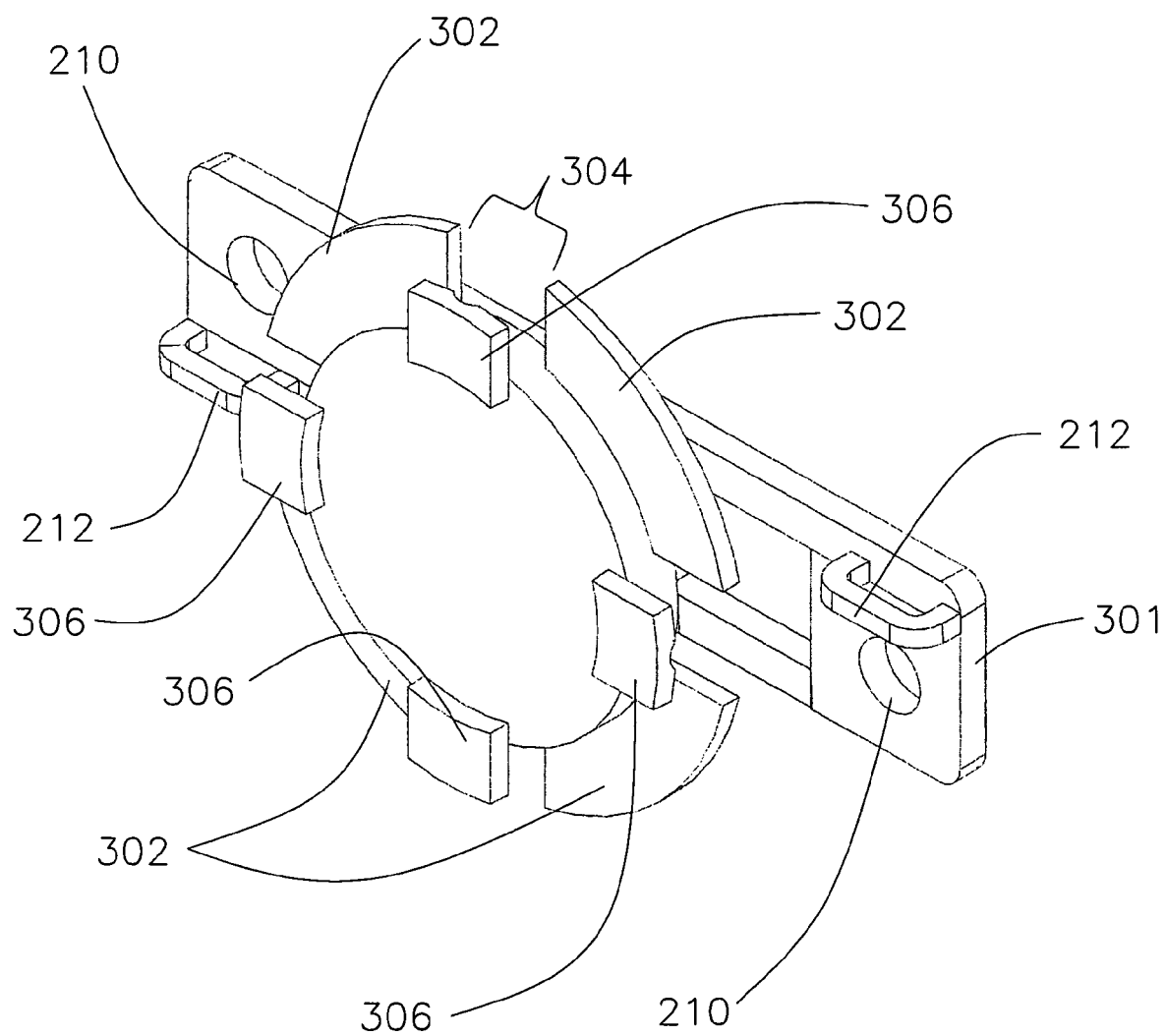
FIG. 3 is an isometric view of a mounting bracket for an electronic device according to one exemplary embodiment of the invention.
Figure 4:
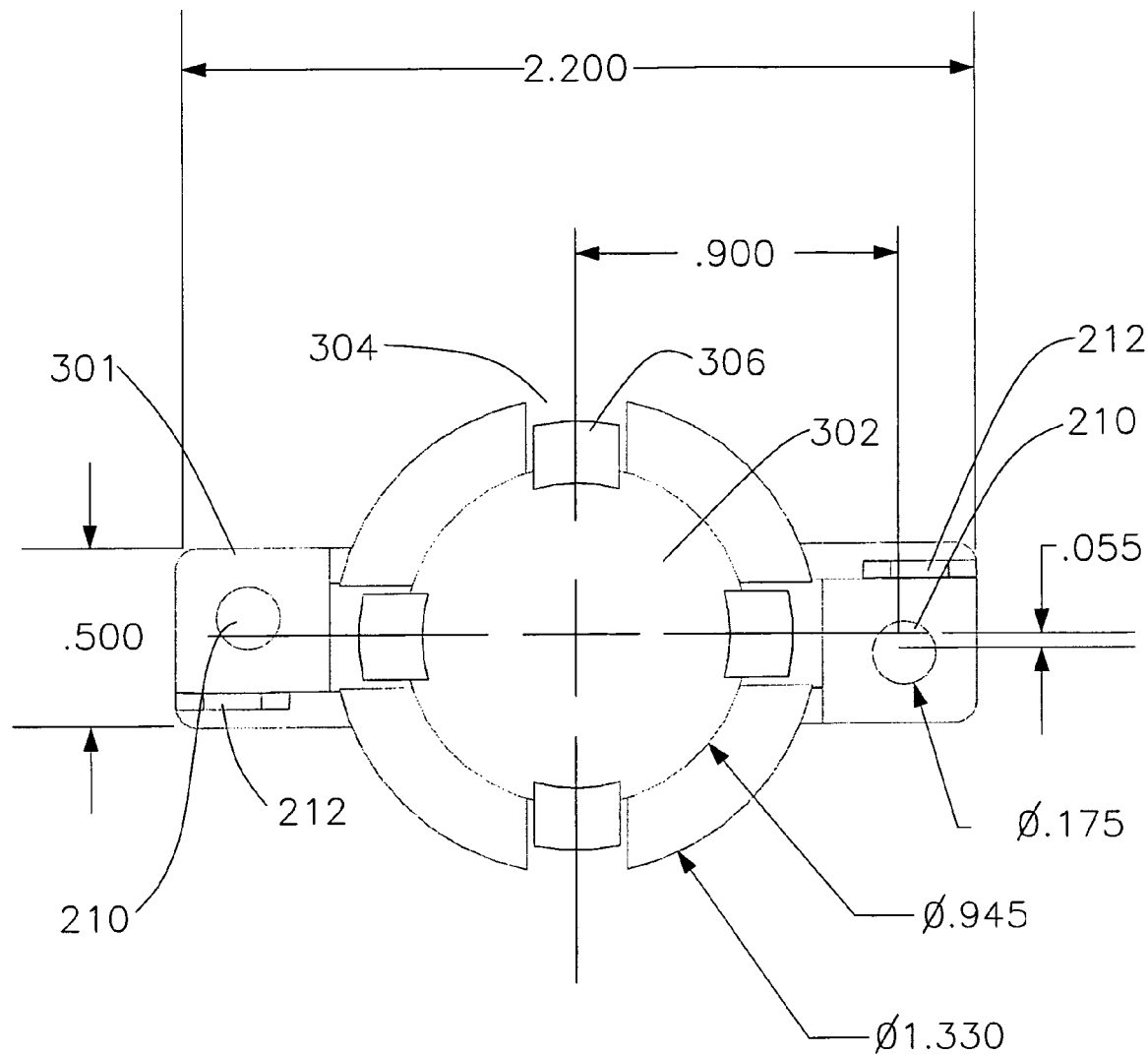
FIG. 4 is a front view of a mounting bracket according to one exemplary embodiment of the invention.
Figure 5:
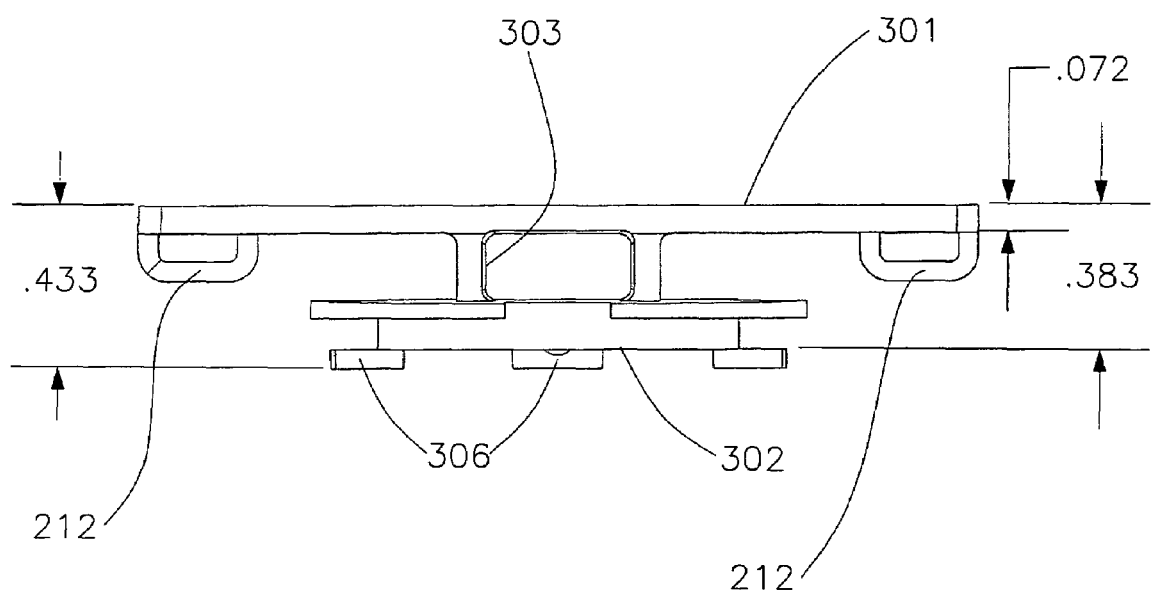
FIG. 5 is a top view of a mounting bracket configured for electronic device mounting according to one exemplary embodiment of the invention.
Figure 6:
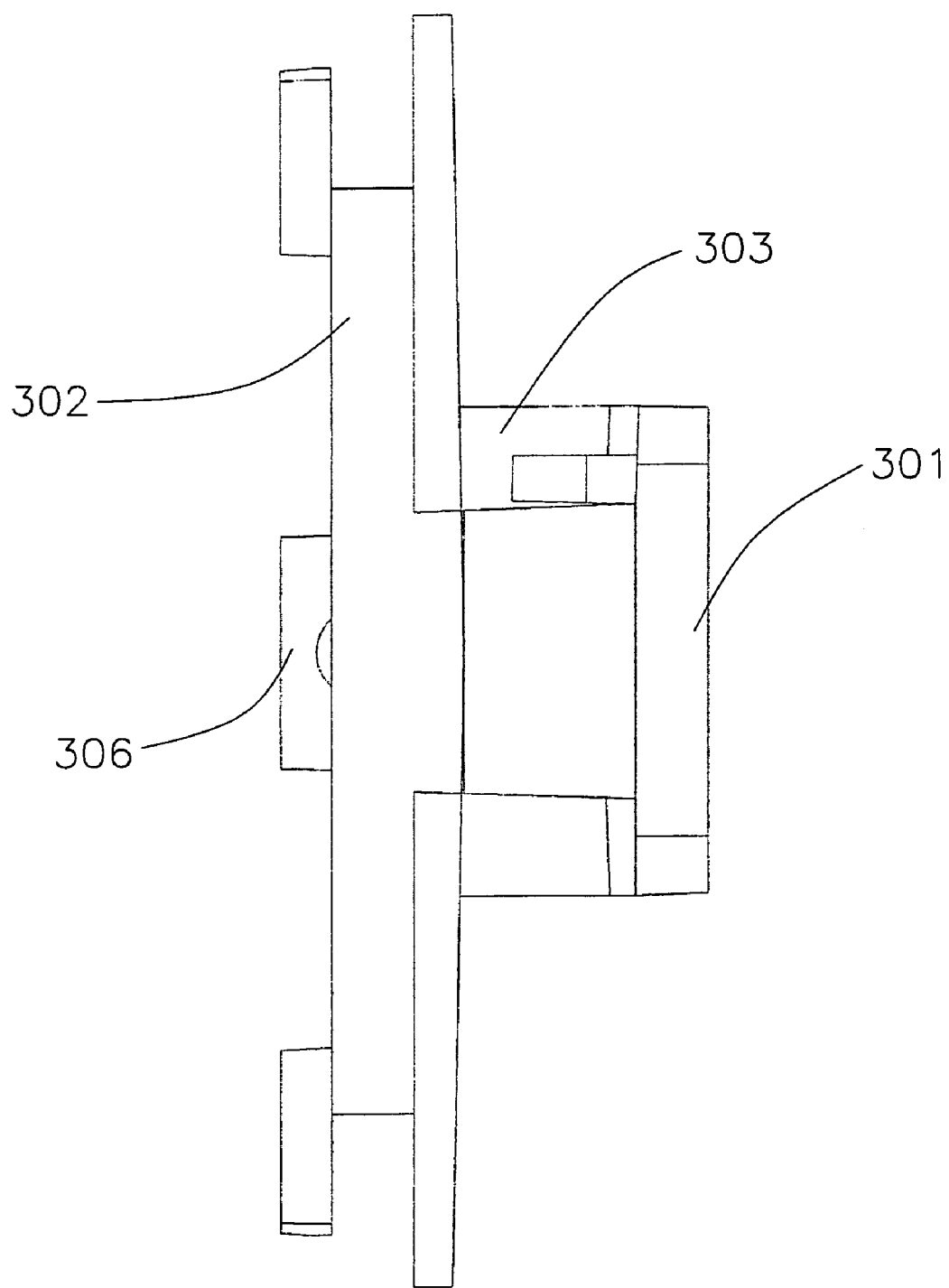
FIG. 6 is a side view of a mounting bracket illustrating the offset of the mounting bracket base and coupling elements according to one exemplary embodiment of the invention.

Referring now to FIG. 2, a power control system 200 illustrates one exemplary embodiment of an electronic device mounting assembly having a control housing 202 with a mounting coupler 204 configured for releasably coupling to a mounting bracket 206. In this exemplary embodiment, the mounting coupler 204 is integrated into a housing base 214 of the control housing 202 and has a coupler cavity 218 for receiving a portion of the mounting bracket 206. It should be understood that in other embodiments, the mounting coupler 204 can be configured as a separate non-integrated fixture attachable to any electronic component or device for mounting the electronic device to an operating environment for the electronic device. The mounting bracket 206 is adapted to mount to a portion of the operating environment in which the electronic device is desired to be mounted. This can often be a harsh or abnormal mounting environment or position, and is enabled by the flexibility of the mounting bracket 206 and its inter-coupling with the mounting coupler 204. The mounting coupler 204 and mounting bracket 206 are configured for multiple coupling and uncoupling with simple user interaction while still ensuring a secure mounting of the electronic device when coupled.

In the exemplary embodiment of FIG. 2, the mounting coupler 204 is configured with the coupler cavity 218 having a plurality of receiving cavities 220 positioned about the perimeter of the coupler cavity 218. Each receiving cavity 220 is configured for receiving a tab 306 of the mounting bracket 206. The mounting coupler 204 includes a securing channel 222 defined by a securing structure 228. Additionally, the securing channel 222 can include a beveled or angled portion 224 to aid in receiving the tab 306 into the securing channel 222. A securing portion is defined by the securing channel 222 and an outer securing surface 229 on the exterior of the coupler 204 opposite to the securing channel 222.

The mounting bracket 206 includes an interlocking portion 305 that includes the tabs 306 and an engaging surface 302. The tabs 306 and the engaging surface 302 are adapted such that the tabs 306 can be received by the receiving cavity 218 and, upon rotation of the mounting coupler 204 and/or the mounting bracket 206, are received within the securing channels 222. Upon the securing rotation, the securing structure 228 defined by the securing channel 222 and the securing surface 229 is secured between the tabs 306 and engaging surface 302 thereby securing the mounting bracket 206 to the mounting coupler 204.

In FIG. 2, the interlocking portion 305 is a circular structure but could have different shapes in other embodiments. Additionally, it should be understood that while the illustrated embodiment reflects the mounting coupler 204 being mounted on the electronic device and being a female and the mounting bracket 206 being mounting to the operating environment and being male, in other embodiments the mounting bracket 206 can be configured with the female receiving cavity and the mounting coupler 204 can be configured with the male portions and still be within the scope of the present disclosure. e.g., the interlocking portion of the mounting bracket 206 can be male or female and the interlocking portion of the mounting coupler 204 can be female or males.

The mounting bracket 206 can be mounting within the operating environment in a variety of manners and with a variety of mounting fixtures. The mounting bracket 206 includes a mounting base 301 that is offset from the mounting structure 305 by an offset portion to aid in the mounting of the electronic device and to create an offset space between the engaging structure 305 and the mounting base 301, and therefore between the electronic device and the surface or structure on which the mounting bracket 206 is attached. The mounting bracket 206 can be adapted for mounting using screws, bolts, rivets, or similar attachment fixtures by one or more mounting holes 210 defined by the mounting bracket 206. In other embodiments, the mounting bracket 206 can include one or more mounting sleeves 212 for receiving and securing a mounting cable or cable tie (not shown). In various other embodiments, as illustrated by way of additional example in FIGS. 11 and 12, the mounting bracket 206 can be adapted for mounting via a DIN Rail fixture as in FIG. 11 or to an electronic panel as in FIG. 12.

Generally, the mounting coupler 204 and mounting bracket 206 are configured to inter-work to engage and mount the electronic device with a securing rotation of the user of less than a full turn. In some embodiments, this can be about equal to or less that a 120 degree rotation, for example in an embodiment having three tabs 306 and three receiving cavities 220. In other embodiments, as shown in FIG. 2, the securing rotation can be about equal to or less than about a quarter turn or 90 degrees where the mounting bracket 206 has four tabs 306 and the mounting coupler has four receiving cavities 220. Of course, as known to those skilled in the art, more or less numbers of tabs 306 and receiving cavities 220 can be utilized and provide a different securing rotational amount and still be within the scope of the disclosure.

By way of further examples, FIGS. 3-6 illustrate different views of a mounting bracket 206 that are capable of mounting and securing electronic devices, such as power controllers, in operating environments such as processing systems including thermal processes. It should be noted that the dimensions and adaptations of these figures are only shown by way of example and should not be construed to limit its scope or implementation as other applications may require other dimensions.

In FIGS. 3-6, this exemplary embodiment of the mounting bracket 206 includes two mounting holes 210 for mounting the bracket 206 on a surface 302 with a fastener (not shown). The mounting bracket 206 includes engaging surface 302 that is offset from a mounting base 301 by an offset portion 303 to provide a keying element. The engaging surface 302, shown as a circle but that can be of any shape, can have sector extensions by the engaging surface 302, each defining a sector gap 304 therebetween. Attached to the engaging surface 302 are four securing tabs 306 dimensioned that can have a greater, equal to or lesser radial size than the sector gaps 304. The combination of the tabs 306 that are offset from the engaging surface 302 and the surface 302 serve as a keying lock for the coupler 214 such that when the keying interfaces of the coupler 214 are aligned with the securing tabs 306 and pressed against the engaging surface 302, the controller 200 or the housing 202 can be rotated relative to the bracket 206 to lock the controller 200 to the mounting bracket 206. In this particular embodiment, the mounting and locking rotation requires no more than 90 degrees of rotation as the tabs 306 are spaced at 90 degree positions. However, in other embodiments, such as one have only two tabs 306 spaced 180 degrees apart or three tabs 306 spaced 120 degrees apart, by way of example, the mounting and locking rotation may be different as suitable for such arrangements. Of course, the mounting and locking rotation can be in fewer degrees than the actual radial spacing between two consecutive tabs 306.

Figure 7:
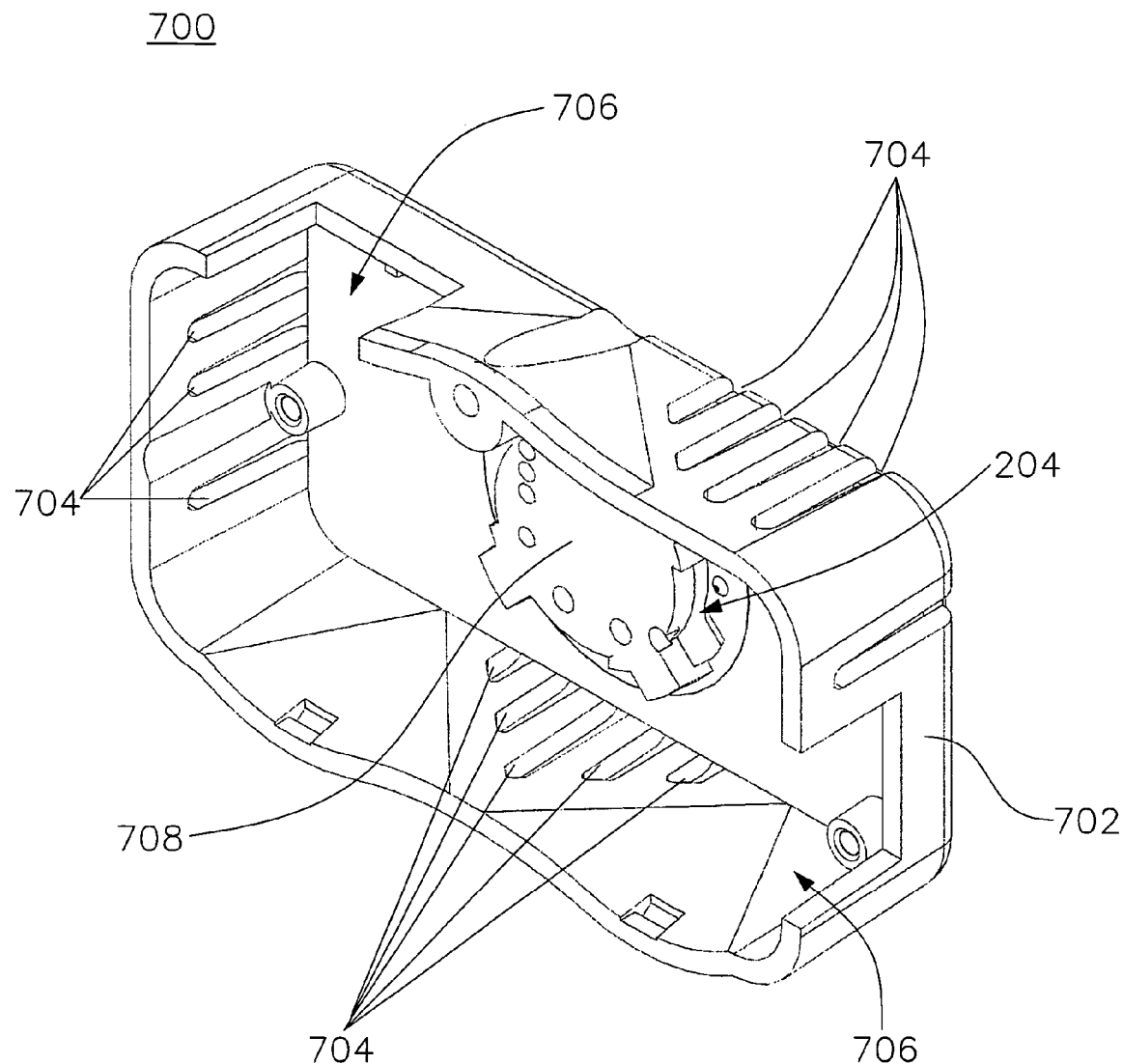
FIG. 7 is an isometric view of an electronic device housing illustrating an integrated mounting coupler with a coupling interface configured for mounting the electronic device in an operating environment according to one exemplary embodiment of the invention.
Figure 8:
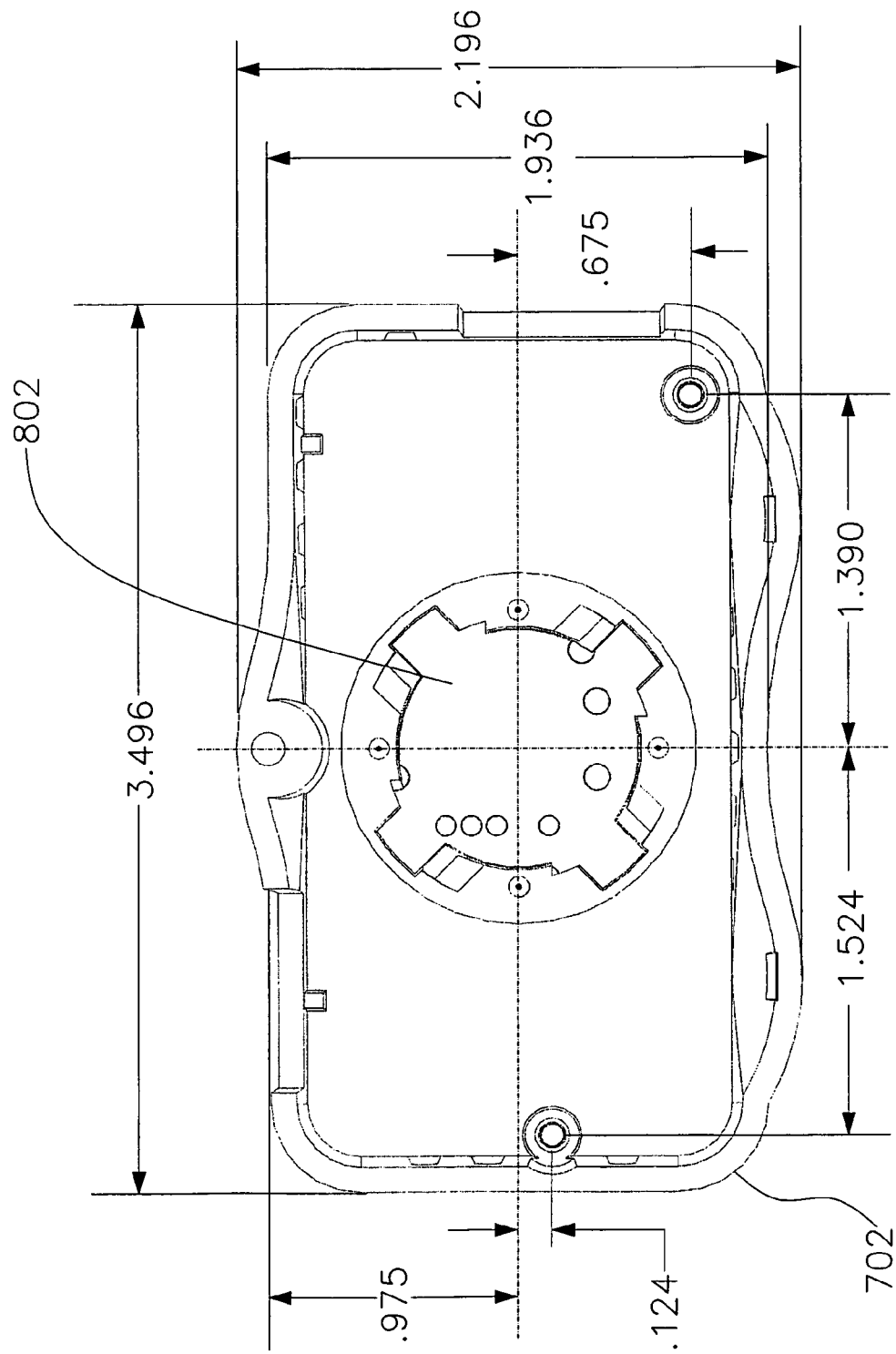
FIG. 8 is a top view of a housing for an electronic device having an integrated mounting coupler for releasably receiving a mounting bracket according to one exemplary embodiment of the invention.

FIGS. 7 and 8 are two views of an electronic device housing 700 having an integrated mounting coupler (such as coupler 204). FIG. 7 is an isometric view of the lower half of the housing 702 for an electronic device such as a power controller. This includes ventilation ports 704 that facilitate ambient air circulation for cooling the housed electronics and connector cavities or connector cavities 706 that accommodate connectors for coupling to external systems such as power conductors, communication conductors, and sensor or signal connectors. In this exemplary embodiment, the mounting coupler 204 is integrally formed by lower housing 702 is centrally positioned on the bottom surface of the lower housing 700. The mounting coupler 204 is configured for coupling with a rotational interlocking interface 708 that is adapted for receiving a mounting bracket, such a mounting bracket 206 or 301 as shown in the examples of FIG. 3-6.

Figure 9:
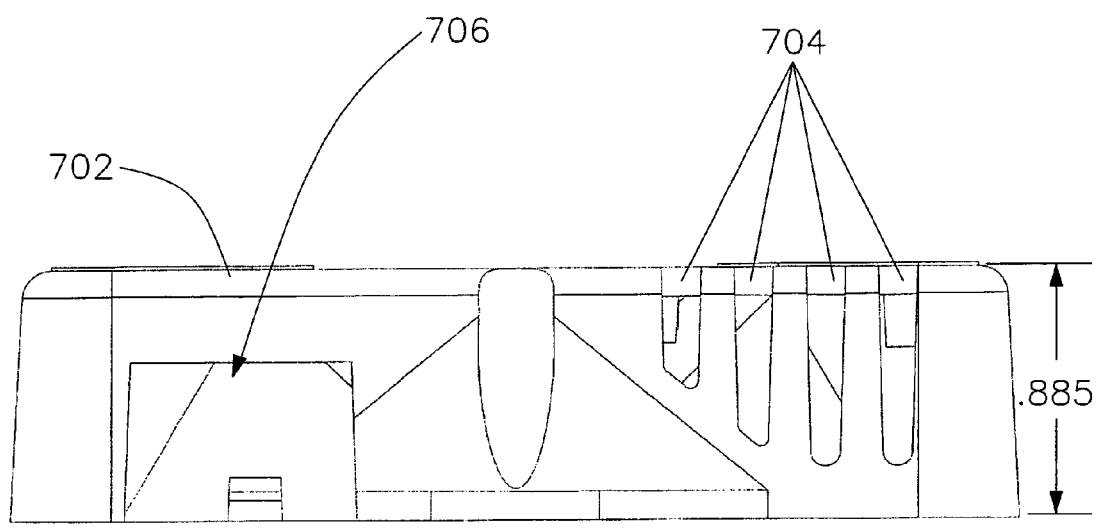
FIG. 9 is a lengthwise side view of a power controller housing illustrating a connector cavity for accommodating a quick connect/disconnect connector for a power/control cable and ventilation ports according to one exemplary embodiment of the invention.
Figure 10:
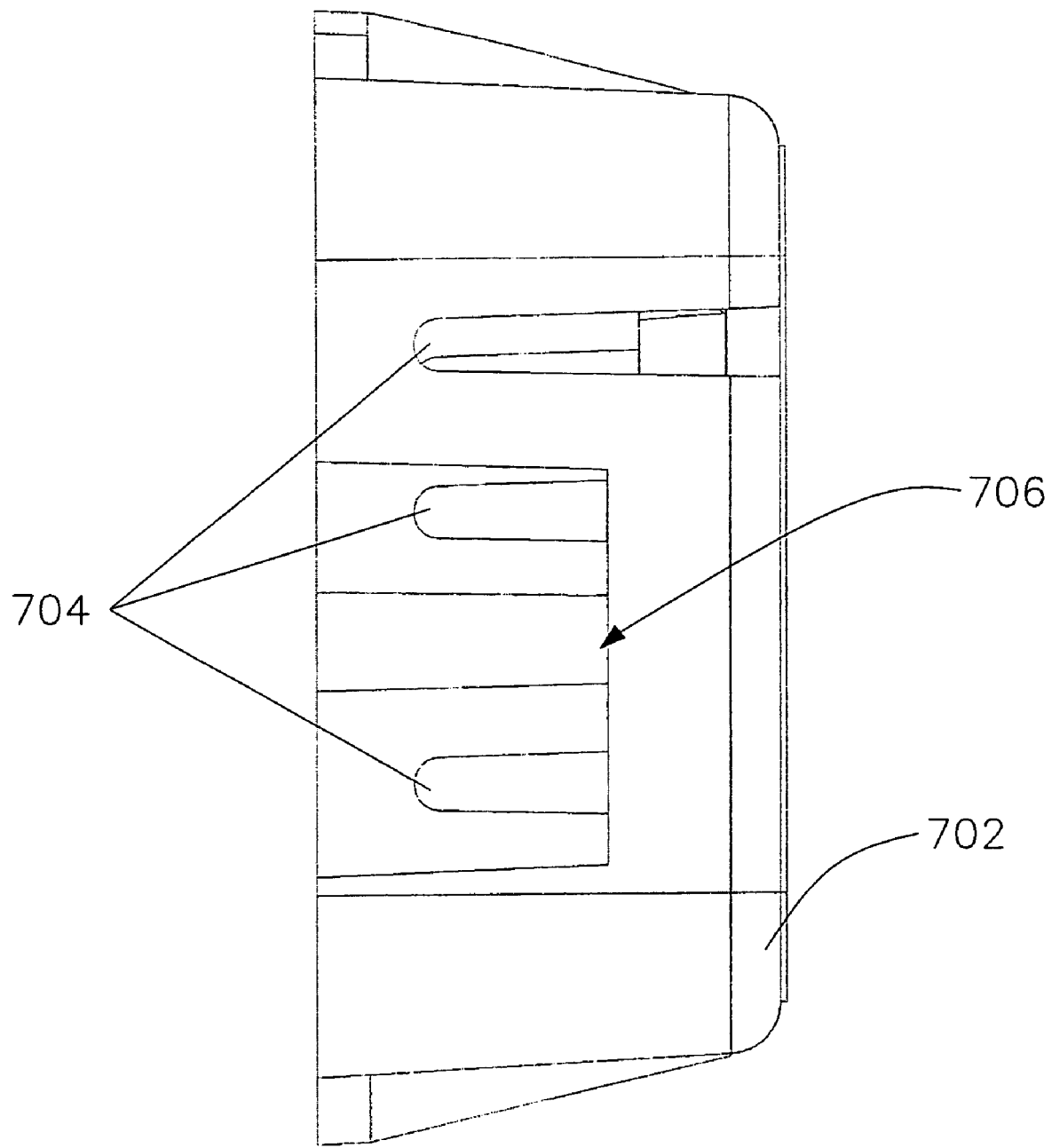
FIG. 10 is an end view of the power controller housing illustrating another connector cavity for accommodating a quick connect/disconnect connector for a power/control cable according to another exemplary embodiment of the invention.

FIG. 8 is a top view illustrating the central location and fixture 802 configured as a coupler with a base keying element for receiving a mounting bracket 206, or a portion thereof. FIG. 9 is a lengthwise side view of the lower housing 702 illustrating its compact dimensions, the ventilation ports 704 and the side connector cavity 706 configured to accommodate a mini-jack connector on a printed circuit board. FIG. 10 is a side end view further illustrating the ventilation ports 704.

Figure 11:
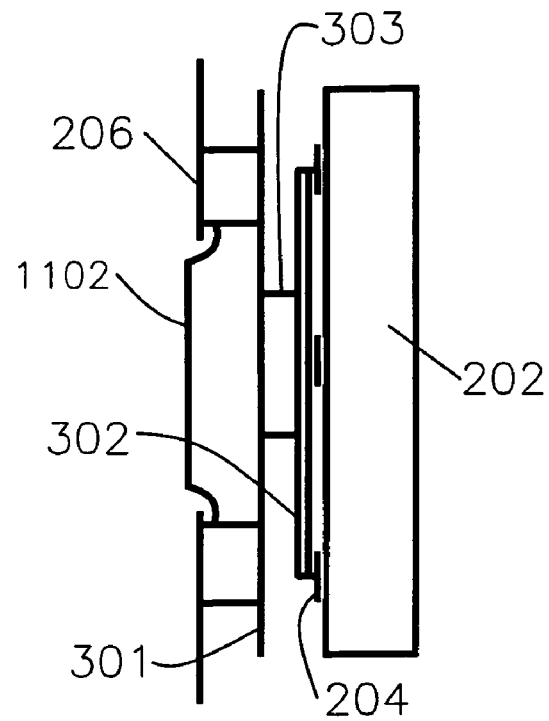
FIG. 11 is a side view of a DIN rail electronic device mounting coupler and bracket according to another exemplary embodiment of the invention.
Figure 12:
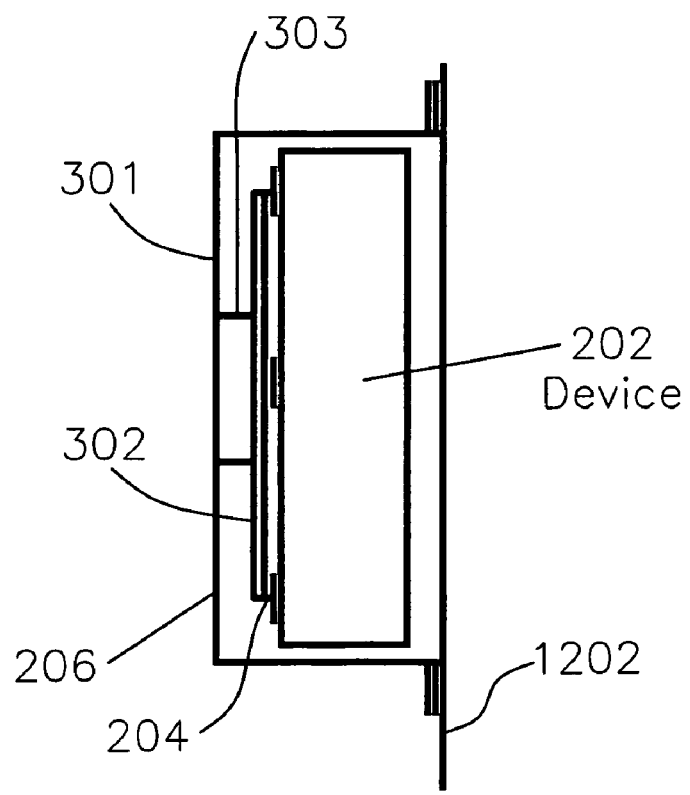
FIG. 12 is a side view of a panel mounted electronic device mounting coupler and bracket according to another exemplary embodiment of the invention.

FIGS. 11 and 12 are side views of two other implementations for mounting brackets. FIG. 11 illustrates an electronic device mounting assembly 1100 configured with a DIN rail 1102 implementation of the mounting bracket 206 and the mounting of the power control system 202 on a DIN rail 1102 according to another embodiment of the invention. FIG. 12 illustrates an electronic device mounting assembly 1200 showing a side view illustrating a panel mounted implementation of the mounting bracket 206 for mounting the power control system 202 on a panel 1202 or panel arrangement according to another embodiment of the invention.

Power Control System

A power control system according to one exemplary embodiment of the present disclosure has been designed to overcome the premature failure of a thermal fuse contained within a heater and thereby eliminating the need for a thermal fuse. Premature thermal fuse failure can occur when high process temperature requirements expose the fuse to temperatures that degrade the internal materials of the fuse over time to the point that the heater unit opens prematurely, rendering the heater inoperable and disabling the manufacturing process. High temperature process transients (e.g., hot exhaust gases) may also contribute to premature thermal fuse failure within the heater.

In one embodiment, a power control system has a controller housing with a power switch disposed within the controller housing for selectively providing power from a power supply to a power load. A limiter, such as a safety limiter, is also disposed within the controller housing and is configured for providing a limit switching function in response to a threshold limit. A controller is also disposed within the controller housing and is configured for controlling one or more operations of the control system. This is in contrast to existing systems where the limiter is deployed as a separate and distinct component from the power switch and controller. Additionally, in some embodiments, a user interface module can be mounted on or within the controller housing for displaying parameters or messages to a user and to receiving inputs from the user, such as user specified threshold limits, selection of a sensor type, or selection of a power switch control profile.

The controller housing includes a case with an internal cavity for receiving and enclosing the power switch, the limiter and the controller therein. The controller housing generally can include thermal venting ports positioned about the periphery of the controller housing to enable ambient airflow through the thermal venting ports and about the limiter and power switch within the controller housing.

Figure 13:
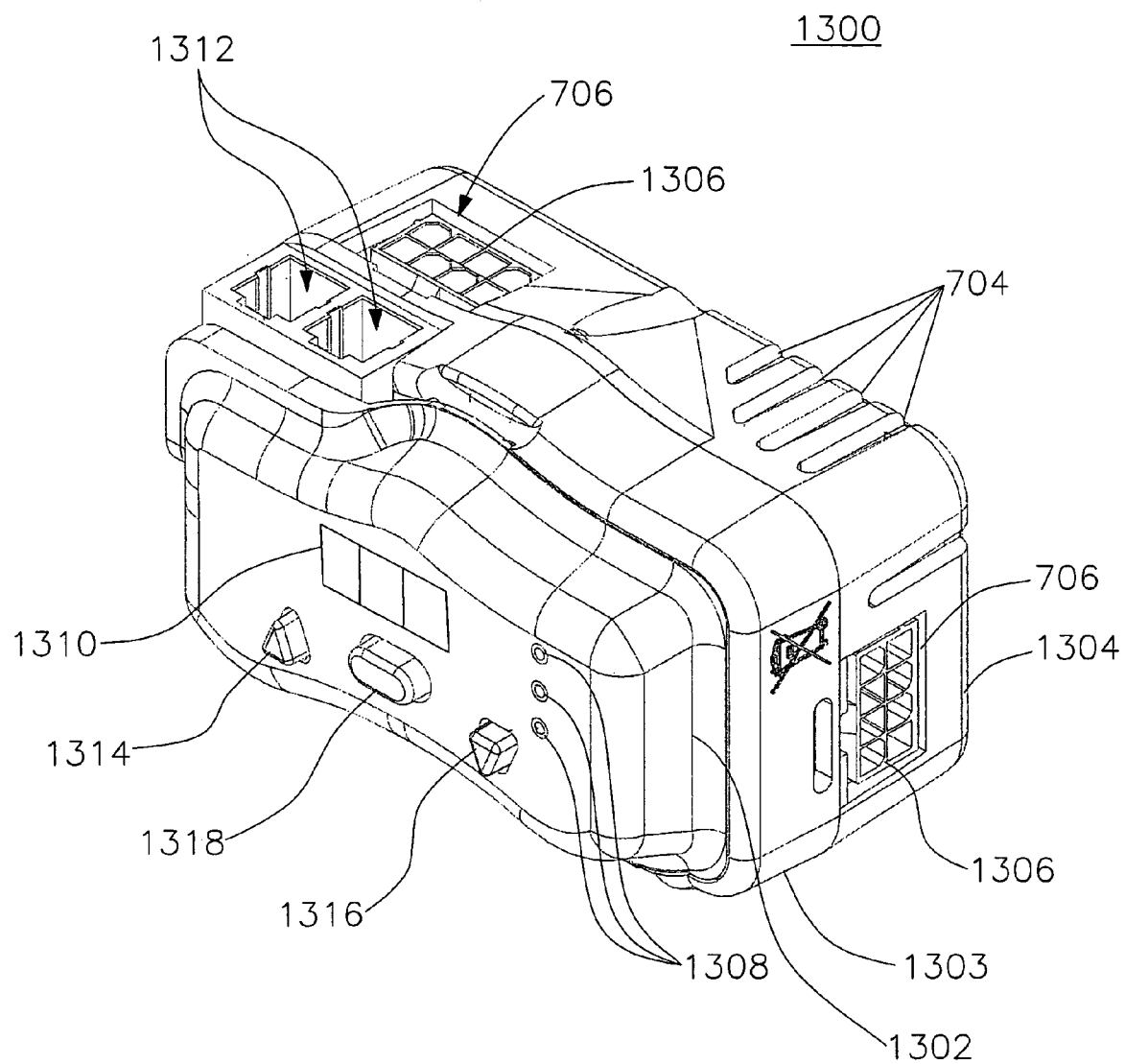
FIG. 13 is an isometric view of a power control system illustrating the digital temperature display with scrolling controls, the asynchronous communications interface jack receptacles and the quick-connect/disconnect power cable interfaces according to one exemplary embodiment of the invention.
Figure 14:
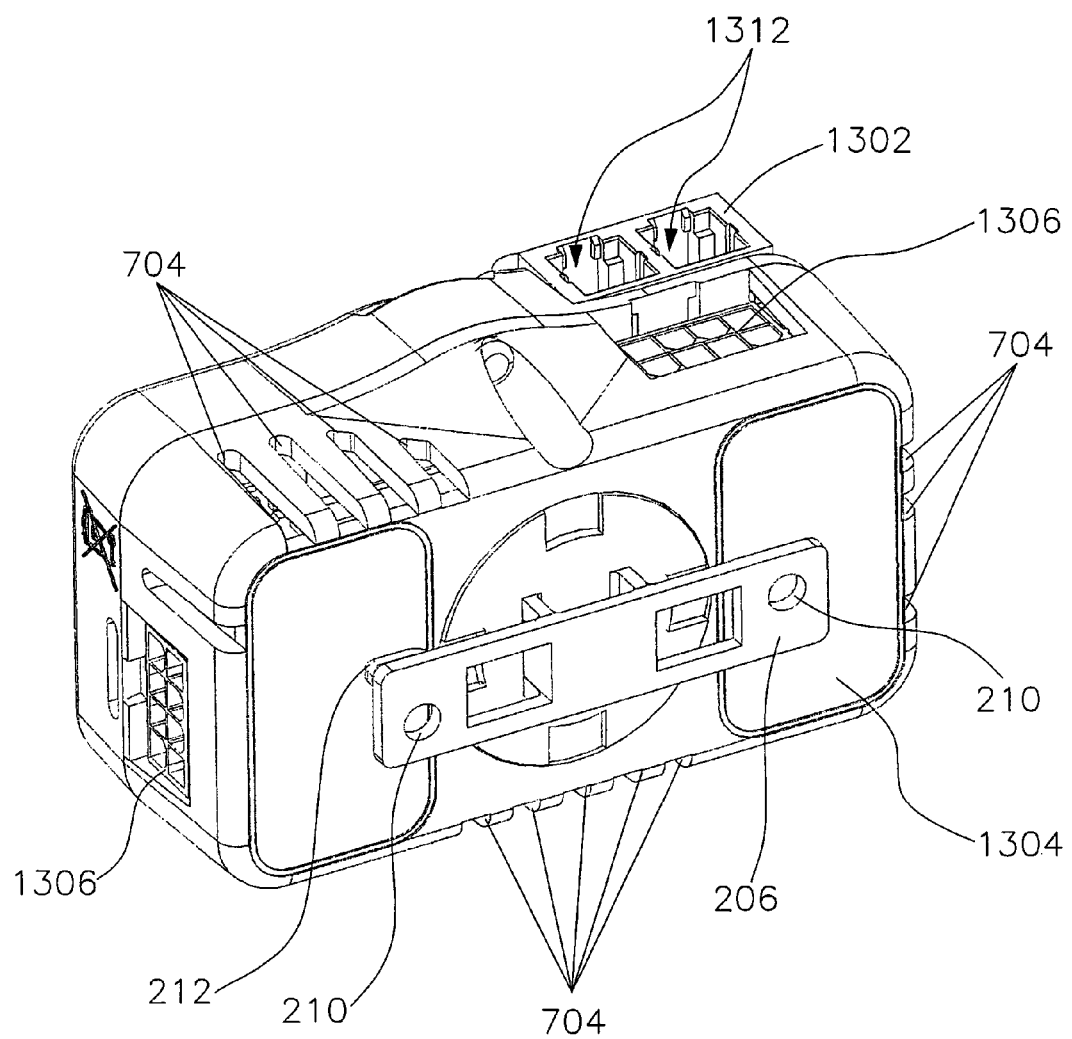
FIG. 14 is another isometric view of a power control system illustrating a bottom housing section connected to a mounting device and ventilation portals according to another exemplary embodiment of the invention.

Referring now to FIG. 13, one example of a control system or controller 1300 is illustrated and includes a user interface assembly 1302 having a user interface housing 1303 connected to a controller housing 1304. The housings 1303 and 1304 function as protective environmental shells for the electronic components housed therein. The controller housing 1304 has connector cavities 706 to accommodate quick-connect/quick-disconnected couplers or connectors 1306, such as a Molex® Minifit Jr.® (registered trademark of Molex) connector, to facilitate a quick connect and disconnect of the power/control cables to a coupled load such as a heater. Ventilation ports or cutouts 704 are provided in the bottom portion to provide portals for facilitating the circulation of ambient air to cool the electronics housed within the controller 1300.

Additionally, to aid in mounting of the controller 1300 in the operating environment, the controller housing 1304 can include or have attached a mounting coupler (not shown) configured for coupling to a mounting bracket (not shown) but as described above by way of example.

The controller housing 1304, or a user interface assembly 1302 associated therewith, can also include one or more visual status indicators 1308 configured to provide a different operational status of the power controller 1300. For example, a first visual status indicator 1308 can be indicative of an output of the controller 1300, a second visual status indicator 1308 can be indicative of an in-range system operation of the controller 1300, and a third visual status indicator 1308 can be indicative of an exceeded range of operation of the controller 1300. In another embodiment, an active red colored LED can be used to visually indicate a high or low temperature alert or may be a flashing red LED signal. A second steady state active amber LED can serve as a visual indication of an in-range temperature operation. The third LED can be of a green color to indicate that the controller 1300 is actively supplying input power to its associated heater. Thus, when the power controller 1300 is not providing power to the heater, the green LED is inactive.

More or fewer visual status indicators 1308, such as lights or LEDs, can have one or more colors indicative of a different status of the power controller 1300. The visual indicators 1308 can be programmed or wired to be indicative of any desired controller functionality or status. In another embodiment, the controller display visual indicators, such as LEDs, are configured to flash to provide an indication of the identity of a specific controller within a series of controllers within a process facility. The flashing of these indicators can be in response to a controller receiving a request to identify itself, as received from a remote operational system. In such embodiments, a central operating system can "ping" the address of a controller and trigger a flashing LED response (e.g., "here I am") to assist operations personnel in locating the controller. Such applications require each controller 1300 to be equipped with a display controller interface. In other cases, the user interface assembly 1302 or controller 1300 can be configured with an audio output device (not shown) for providing an audio notification or identification signal in response to the request to identify. In other embodiments, the controller 1300 and/or the user interface assembly 1302 can be configured with a system identification module (not shown) capable of generating a system identification signal or message over the data communication interface.

The controller housing 1304 and/or user interface housing 1303 can be of compact size that can be easily mounted in an operating or processing area close to the power load. For instance, the power controller could provide controlled power to a heating element in a processing system. In such an application, a compact integrated power controller 1300 can include an integrated limiter, such as a safety limiter, can be placed very near a heating element. While the relative compactness of the power controller 1300 can vary depending on the power delivery requirements, as is known to those skilled in the art, in one exemplary embodiment, the controller housing 1304 has a total externally defined shape defining an external maximum dimensions defining a volume of less than or equal to about 24 cubic inches. For example, in one implemented embodiment, an exemplary power controller 1300, as shown in FIG. 2, has the dimension in inches of 3.496×1.582× 2.196 without a mounting bracket. As will also be discussed, the power controller 1300 can also include a user interface assembly 1302 having a user interface housing 1303. In such embodiments, one exemplary embodiment can have dimensions in inches of 3.496×2.503×2.196. Of course, it should be understood that other dimensions and shapes can also be implemented and still be considered within the scope of the present disclosure.

In another embodiment, the power control system includes a first coupler configured for receiving power from a power source and a second coupler configured for providing power to the power load. In one embodiment, the first coupler is configured for providing a temperature alarm signal indicative of an alarm condition of the system and/or the second coupler is configured for receiving a temperature signal from a temperature sensor. In some embodiments, the second coupler is configured for receiving a plurality of temperature signals from a plurality of temperature sensors. Additionally, in some multi-coupler embodiments each coupler can be color coded to aid in the use of the system. For example, a first coupler and a second coupler are color coded to indicate one as an input coupler and one as an output coupler. In one embodiment, the first coupler is colored black and is configured as an input from a power source. The second coupler is colored white and is configured as an output to a heater and a sensor.

In some embodiments, the controller housing 1304 can also be configured to facilitate the retention of any attached or coupled connector to one of the couplers in the harsh operating environment. This is described in greater detail below, but can include a spring or flexible retaining mechanism that engages a portion of the connector when inserted into a coupler of the controller 1300 to supplement the connector spring that often wears out after use or is susceptible to the harsh operating environment, such as high temperatures.

The power switch (not shown) can be any type of switch capable of selectively providing a portion of the received power to a power load. This can include a contactor, a relay, a solid state device, a knife switch, a mercury switch, and a cam switch, by way of example. Additionally, in some embodiments additional circuitry or functionality can be included to aid in the switching function. For example, where the power switch includes a relay, the power control unit or the controller therein can include an arc reduction relay control circuit or function for controlling arcing across contact points of the relay.

While the controller 1300 can be configured for controlling a variety of operations of the power control unit including the power switch and the limiter, in some embodiments, one or both of the power switch and the limiter can be configured to selectively provide power to the load independent of the controller. In such cases, one or both can include a separate control circuit or processor function.

In some embodiments, the limiter can include a separate processor and memory and a limiting switch or device for disconnecting the power provided by the power control unit to the power load. For example, the limit switch can be a mechanical relay or solid state relay configured to open in response to the limit threshold and to close in response to a change in a sensed temperature relative to the limit threshold and upon a recycling of the limiter. The limit switch can be coupled before or after the power switch. The limit threshold can be any known or desired threshold of any operating parameter is which a control decision or event is made. For instance, this could include a temperature, a pressure, a humidity, a flow, and a time parameter, by way of example.

The power controller 1300 can be configured to store and operate with one or more user definable threshold limits, such as a high limit and low threshold limit, or multiple high and low threshold limits rather than a single upper or lower limit threshold. In this manner, a variety of different safety limit functions or operations can be performed by the single limiter based upon operational or processing needs. This can also be integrated with the power switch and the controller for the power switch to provide programmable profiles for a plurality of operating processes and functions. The limit thresholds can be preprogrammed or can be input by a local or remote user interface. As will be discussed, in one embodiment, a detachable user interface module may be coupled to the control unit that enables a user to input or select one or more of the controller functions, as well as selecting one or more limit thresholds. In other embodiments, the limiter can be configured to be operative in response to a signal received from the controller or from a remote operational system via a communication facility or link.

A user interface or user interface module can be configured as described in more detail below. But can be configured to inter-work with the power controller to provide a human machine interface to the controller for receiving user input including a value of a control system operating parameter such as the threshold limit. While the user interface can be integrated into the controller and the controller housing, in some embodiments, the user interface module, the controller housing and the controller are configured for releasable coupling of the user interface module from the controller housing and providing a releasable physical and electrical coupling of the user interface module with the other components of the control system. As noted, the user interface can include a display, such as a digital display, one or more user input mechanisms such as knobs, buttons, by way of example, and one or more data communication interfaces for communication with a second power control system or an operational system. The user interface module can include a security module or function to provide secure access to the user interface module by a user or via the data communication interface.

The controller 1300 can also be configured with a re-settable parameter such as an over-temperature value for a control system having a built-in mechanical relay safety limit. The controller 1300 can be configured to provide this function by controlling the limiter or the limiting function in combination with controlling the mechanical relay or other approved safety limiting switch. This non-invasive procedure can reset the temperature value via the user interface and therefore can prevent the requirement for a fuse replacement and/or opening of the power controller 1300 which is required by other systems.

Another exemplary parameter re-setting facilitated by the controller 1300 and user interface assembly 1302 of various embodiments of the present disclosure includes a low temperature alarm (LTA) value limit function. A low temperature alarm may be required within a process system to provide freeze protection or notification to operators that process conditions are below a limit value where condensation of fluid material may occur, resulting in clogging of media transfer devices (e.g., pipes). The power controller can be configured to permit the re-setting of a LTA value via push button keys of the user interface by controller software. The programmed inputs being reset in this example include the lower and upper temperature bounds for the process under control. These limits can be reset by the user without having to shut down the process under control, thereby eliminating any production shut-down costs that may be incurred by other prior art control systems that require disconnecting the controller to gain access to internal components to replace standard components or to recalibrate or reset control set points. This is an improvement over systems that required access to internal components such as the resetting of dip switches or the tweaking of potentiometers for digital or analog controlled components, respectively. The present invention overcomes these limitations by providing external operator controls to reset control parameters.

As noted above, in one exemplary implementation of a power control unit or controller 1300 of this disclosure, the power controller 1300 can be configured for selectively providing power to a heater as the power load. In some such embodiments, the power control unit can include a sensor input for receiving a temperature signal from a temperature sensor associated with the heater. Additionally, in some cases, a second sensor input can be provided for receiving a second temperature signal from a second temperature sensor associated with the heater. In the later case, one or both the controller and limiter can be configured to receive either one or both of the first temperature signal and the second temperature signal.

For example, in one embodiment, both the controller and limiter receive both temperature signals. The controller and the limiter can both operate on one or both signals, with one of them being a backup or safety check. In other cases, the controller and limiter can communicate one or both signals to the other component as a feedback or comparison input into the controlling functions. In this manner, both the limiter and the controller have redundant inputs for one or more temperature signals, thereby providing increased operations of the power control unit. In other embodiments, more than two temperature or other signals can also be received and utilized in a similar manner for controller and limiter operations. For example, one or both of the temperature signals from the temperature sensors associated with a heater can be utilized by both the controller and the limiter to ensure proper temperature control of the operation as well as to ensure the safety of the process, the heater, the power control unit and system.

In other embodiments, the controller 1300 can include a low temperature alarm module (not shown) configured for receiving a low temperature threshold as defined by a user or an operational system. A temperature from a temperature sensor is provided to the controller as discussed above, and the controller can generate an alarm in response to the received measured temperature being less than the predefined low temperature threshold. This can be helpful in trouble shooting a processing system since low temperature can often significantly impact the quality of the production process.

As noted, the controller 1300 can include a processor and a memory and/or computer readable medium having computer executable instructions for performing a controlling function of the power switch, the limiter, or other power controller functions. For example, the controller 1300 with the processor, memory and computer executable instructions can be configured to generate the power switch control signal as a function of a control algorithm or function, such as, a proportional, integral, derivative (PID) function, an adaptive PID function, a proportional function, a proportional/integral function, a proportional, integral, and two derivative control (PIDD) function, a feed forward function, and a feedback function, by way of example.

In some embodiments, a power controller 1300 can be a power controller for a thermal processing system and include a controller housing, an input power interface for receiving power from a power source and an output power interface for providing power to a power load. A power switch is disposed within the controller housing for selectively providing, at least a portion of, the received power to the power load. A temperature sensor interface is configured for receiving a temperature signal from a temperature sensor. A safety limiter is disposed within the controller housing and includes a plurality of threshold temperature limits. The limiter is configured for providing a safety limit switching function in response to two or more of the threshold temperature limits and the received temperature signal. A controller is disposed within the controller housing and is configured for controlling the selective providing of power by the power switch.

In some embodiments, a method of providing power to a heating element includes receiving power from a power source, sensing a temperature associated with the heating element, and selectively providing, at least a portion of, the received power to the heating element in response to the sensed temperature. The method also includes comparing the sensed temperature to a plurality of safety thresholds, and limiting the selective providing of the received power to the heating element in response to the comparing. As noted above, the method can include receiving two or more user defined safety thresholds. In such cases, the comparing can include comparing the two or more user defined safety thresholds for providing the limiting function.

As noted above, in some embodiments, the power control system having a power switch with a relay can include a no-arc relay control circuit or function also within the controller housing. The no-arc relay control circuit can include an auto-clean module with a relay contact cycle counter for counting the number of relay cycles. The auto-clean module can suppress an operation of the no-arc control circuit as a function of the number of relay cycles to provide an arc across the relay. While the number of cycles can be any number, in one embodiment the auto clean module enables the arc across the relay in about every 20,000 relay cycles to provide for cleaning of the contacts. In another embodiment, the auto clean module can enable the arc across the relay during initial powering of the system. The no-arc relay control circuit can also suppress arcing upon the opening of the relay but allows for arcing during the closing of the relay. In some embodiments, the no-arc relay control includes a solid state switching device coupled in parallel with the relay.

In some embodiments, a no-arc circuit can be incorporated into the thermal control system by having the contacts of a relay type power switch in parallel with a solid state switching device. Such a no-arc circuit and method provides for the extended life of the relay. For instance, most manufacturers rate the life cycle of relays at 100,000 cycles. However, a no-arc circuit having a solid state switching device in parallel with the relay contacts has been demonstrated as extending the life of the relay to greater than 3,000,000 cycles, a thirty-fold improvement. In addition, in some embodiments an "auto clean" module and protocol includes a contact cycle counter for counting the number of relay contacts and provides for the allowed arcing at predetermined cycle counts to allow for self-cleaning of the relay contacts. For instance, in one embodiment the cycles are counted and the relay is allowed to arc approximately every 20,000 cycles. As such, the "no-arc" suppression circuit is eliminated or bi-passed to allow for the natural arcing to occur across the contacts of the relay. In another embodiment, the allowed cleaning arc can be a manicured or conditioned arc, for example, of a particular level or duration, or can be only during opening or closing of the contacts. The controlled arcing provides for the removal of oxidation on the relay contacts that may build up due to the elimination of natural arcing. This is especially applicable in low current applications In another embodiment, a no-arc circuit can minimize or eliminate contact damage from arcing when the relay contacts are opened. This circuit allows for minimal arcing to occur during the making of the contacts thereby allowing cleaning action to remove carbonization and contamination material from the contract surface. Otherwise, the circuit eliminates arcing during the opening of the relay contacts as arcing during opening is more damaging to the relay contacts. In other embodiments, a circuit or function can be configured to eliminate arcing completely. In one or more embodiments of the invention, an inductive kick from the switched device is also provided to its parallel solid state device to eliminate the arc during opening of the contacts. The no-arc circuit can also provide timing for the on (conducting) duration of the solid state device to minimize the on-time conducting duration of the solid state device, that can produces an embodiment that requires no heat sinking of the solid state device.

Power Controller User Interface

In some embodiments, a user interface assembly for a power controller has a housing adapted for mechanically coupling to a controller housing of the power controller and a display visible on an outer surface of the housing for providing a visual presentation to a user. The user interface housing can be a compact case for enclosing the user interface assembly. The housing can include one or more engaging features, such as locking tabs, clips, edges, flanges, by way of example, for mechanically coupling the user interface housing to a receiving portion of the controller housing. The housing can also be dimensioned to be an integrated unit with the controller housing upon the mechanical coupling of the housing to the controller housing.

The display can include any type of display capability such as LEDs, LCDs, or a full graphical, digital or analog display. The display can be configured for presenting a plurality of parameter values to the user in response to the user manipulating the user input mechanism. A user input mechanism is configured for receiving an input from the user and can be configured for controlling an operation of the power controller when coupled to the user interface assembly. The user input mechanism can be generally configured to receive an input or instruction from a user and to communicate the received input or instruction to the controller, a limiter, or any other component or function of the power controller. The user input mechanism can include any type of input including one or more buttons, knobs, keys, voice inputs, touch pads, joysticks, a scroll, a ball, by way of example.

A user interface circuit is disposed within the housing and is coupled to the display. The user interface circuit can coordinate between displaying one or more characteristics or messages for the user, receiving the inputs from the user input mechanisms, and communicating the information to and from one or more components of the power controller. The user interface circuit can include a security module or function that is configured to require the receiving of a security code such as a password by a user prior to enabling the user interface or prior to receiving a user input or to communicating a user input to another power controller component. The security code is typically a predetermined code. The user interface circuit can be configured to display a prompt to the user on the display, receive an input from the user input mechanism, and compare the user input to a predetermined security code.

The user interface assembly can include a connector adapted for electrically connecting the user interface circuit to an electrical connector associated with the power controller. This connector can include a mechanical coupling as well as an electrical coupling. In some embodiments, this can be a physical coupling or a wireless coupling using one or more communication frequencies or wavelengths and associated wireless interfaces.

The user interface assembly can also include a visual indicator configured for receiving a visual signal generated by a controller or the controller housing upon mechanical coupling of the housing to the controller housing. This can include a relaying the received visual signal to a visible portion of the user interface assembly for providing a visual indication of the received visual signal. For example, a power controller can include one or more LEDs that may be indicative of a status or operation of the controller. Rather than duplicating the LEDs that may be located on a portion of the controller housing to which the user interface assembly is attached, the user interface assembly can be configured to include one or more passive light conducting channels such as a plastic or fiber optic material such that the received light from the LEDs are repeated to an external portion of the user interface assembly without requiring the cost of an active circuit or function. Of course, in other embodiments, the user interface assembly can include an active circuit or function for also providing power control system or component status or operations.

The user interface assembly can also include a data communication interface coupled to the user interface circuit for communicating with a secondary system such as another user interface assembly, another controller, or an operations system. The data communication interface can be a wired interface including a coupler or connector for mechanical and electrical coupling to a data communication facility. In other embodiments, the data communication interface can be a wireless interface including a wireless transceiver. The user interface circuit can include a system identification module for generating a system identification signal over the data communication interface to provide for identifying the particular control unit from among a plurality of control units in a communication facility or in an operational environment. This can be automatically provided upon connection to the communication facility or can be in response to a ping or a request via a data communication protocol.

In some embodiments, the user interface assembly can also be configured with a visual or audio generator or indicator that provides a visual and/or audio identification or indicator in response to the data communication interface receiving a power control system identification request signal from another system. This capability can enable a user to ping all or particular power control systems and/or user interface assemblies to help to identify one within a complex operational implementation that may require service or maintenance.

Figure 27:
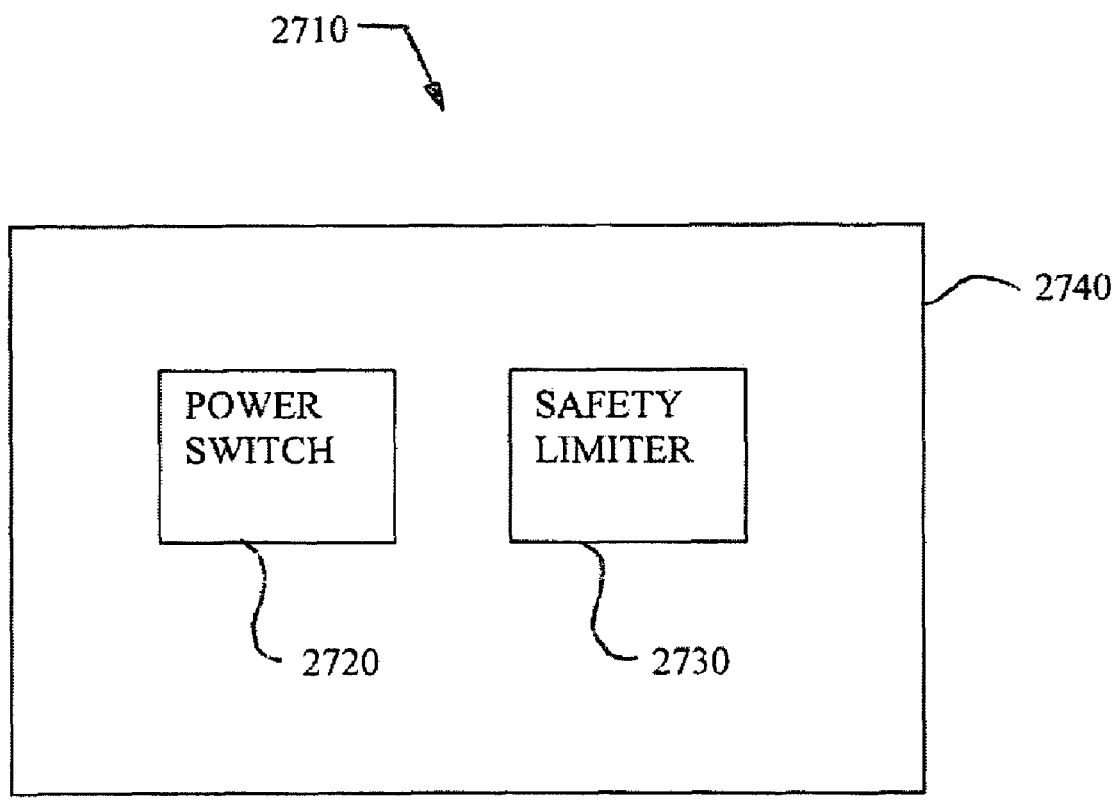
FIG. 27 is a schematic view of one exemplary embodiment of a power controller.

In some embodiments, a power control system has a control unit with a controller housing, a power switch disposed within the controller housing for selectively providing power from a power supply to a power load and a controller disposed within the controller housing that is configured for controlling the selective providing by the power switch, and a user interface connector. A limit switch can be disposed within the controller housing and can be configured for providing a limit switching for terminating the providing of power by the control unit to the power load in response to a threshold limit. The user interface assembly, as described above, can be coupled to this the power controller housing. The user interface assembly can be configured to receive one or more threshold limits, power switch, or controller parameters or controls from the user. In some embodiments, the control unit can be configured for selectively providing power from a power supply to a power load independent of the user interface assembly being coupled to the control unit. In other embodiments, one or both of the controller and the limiter can be independently configured for operating independent of the user interface assembly being coupled to the controller housing and the controller. In light of above description, one exemplary embodiment of a power controller 2710 including a power switch 2720 and a safety limiter 2730 enclosed within the housing 2740 is showen in FIG. 27.

Additionally, in some embodiments, a cover can be adapted for coupling to the controller housing in the absence of the user interface housing being coupled to the controller housing.

According to still another aspect of the invention, a method for operating a power controller includes connecting an input of the power controller to a power source, connecting a power load to an output of the power controller and coupling a user interface assembly to a housing of the power controller. The power controller housing encloses a power switch, a limiter, and a controller. The method also includes inputting a limit threshold into the user interface assembly. The user interface assembly is configured to transmit the limit threshold to the controller for controlling the limiter.

The user interface assembly can be configured for transmitting one or more limit thresholds or one or more replacement limit threshold from the user interface assembly as input by a user or as received via a data communication to the controller. The controller and/or the limiter can receive the transmitted thresholds for controller the providing of power in response thereto.

By way of example, in one operation of the user interface assembly or module, the user can input or select a control set point via user manipulation of push button keys or via controller-specific software commands that allow user adjustment of set point parameter values. Adjustments to set points can be provided during operation of the controller via the user interface assembly without requiring placing the controller in an off-line mode. In this manner, process changes can be implemented for different temperatures, alternative media, changes to sensor or sensor types, and for process improvements during processing or operations.

In some embodiments, a user interface assembly for a power controller has a housing adapted for mechanically coupling to a controller housing of the power controller in a releasable manner, a display visible on an outer surface of the housing for providing a visual presentation to a user, and a user input mechanism for receiving an input from the user. The mechanical coupling can be by a variety of different mechanical coupling mechanisms including tabs, clips, flanges, cam surfaces, magnets, by way of example.

A user interface circuit is disposed within the housing and coupled to the display and the user input mechanism for controlling an operation the power controller when coupled to the user interface assembly. A connector is coupled to the user interface circuit and is adapted for electrically connecting the user interface circuit to an electrical connector associated with the power controller upon the mechanical coupling of the housing to the controller housing and electrically disconnecting upon mechanical decoupling of the housing from the controller housing.

Additionally, the user interface assembly can include one or more connectors or interfaces for coupling to an external communication facility or connector associated therewith. The communication interface can provide for communication with operational systems or other user interface assemblies or controllers within the operating environment of the power control system.

In some embodiments, the housing, connector, and user interface circuit are all configured for releasably coupling of the user interface assembly to a controller housing and controller on a hot pluggable basis, e.g., without requiring the controller to be placed in an off-line or idle mode. For example, a controller can have an inactive mode when power is not being provided to a load and an active mode when power is being provided. In these cases, in some embodiments, the user interface module can be configured to be coupled or uncoupled from the controller during the active mode and/or the inactive mode. This has significant operational advantages over the previous controllers and user interfaces by enabling a user to change or re-program a controller without interrupting a current process.

As the user interface assembly is adapted for releasable coupling to the controller housing, the user interface assembly can be utilized for coupling to more than one controller housing and therefore to more than one controller at separate instances. In this manner, a single user interface assembly can be utilized for individually interfacing a plurality of controllers implemented in an operating application. In some embodiments, a cover can be provided to take the place of a user interface when the user interface module is not attached to the controller. The cover can provide for protecting or sealing the controller housing, protecting wiring connections, or providing improved looks of the controller. Additionally, the cover can be configured to include an active or passive visual indicator or other features or functions that may be desired of a less than full featured user interface module.

In some embodiments, a power control system includes a control unit having a controller housing, a power switch disposed within the controller housing for selectively providing power from a power supply to a power load. A controller is disposed within the controller housing and is configured for controlling the selective providing of power by the power switch. The controller includes a user interface connector. The control unit can also include a limiter disposed within the controller housing configured for providing a limit switching function in response to a threshold limit and wherein the user interface assembly is configured for receiving user input including a value of the threshold limit and communicating the received threshold limit to the limiter.

In some embodiments, the invention can include a method of controlling a power controller containing a power switch and a controller configured for selectively providing power to a power load includes releasably coupling a user interface module to a controller housing containing the power switch and the controller and displaying a controller parameter on the user interface module. The method also includes receiving a user input including a user definable parameter value via the user interface module and communicating the user definable parameter value from the user interface module to the controller. The method further includes decoupling the user interface module from the controller housing and controlling a function of the controller in response to the user definable parameter value.

In other embodiments, a method for operating a power controller provides power to a power load wherein the method includes connecting an input of the power controller to a power source, connecting an output of the power controller to the power load, and coupling a releasable user interface assembly to a body of the power controller. The power controller body encloses a power switch, a limiter, and a controller. The method also includes inputting a controller parameter value into the releasable user interface assembly. The releasable user interface assembly communicates the controller parameter value to the at least one of the controller and the limiter. The method further includes providing at least a portion of the power received at the input from the power source to the power load connected to the output in response to the input controller parameter value and decoupling the releasable user interface assembly from the power controller body.

The method can also include re-coupling the releasable user interface assembly to the power controller body, inputting a replacement parameter value, such as a safety threshold value for the limiter or/and a power switch setting, into the releasable user interface, communicating the replacement controller parameter value from the releasable user interface assembly to at least one of the controller and the limiter, and controlling at least one of the controller and the limiter for selectively providing power to the power load in response to the replacement parameter value. Additionally, the method can include decoupling the releasable user interface following the inputting a replacement controller parameter value, the decoupling being during the controlling of the selective providing of power to the power load.

As noted above, there can be more than one power controller adapted for receiving the same user interface assembly. In such cases, a first power controller having a first power controller body and a second power controller connecting a second power load to an output of the second power controller are each releasably coupable to the same user interface assembly for controlling or receiving an input from a user.

Referring again to FIG. 13, the user interface module or assembly 1302 includes a digital display 1310 for indicating an operation of the system which can be configured to display diagnostic information as well as set point information. A data communication interface 1312 is provided for communication with secondary system. The data communication interface 1312 can be enabled for communicating with multiple other systems, or with a remote controller or control system.

The power control system can include an integrated limiter that is programmably set by front panel controls. When the programming mode is enabled, the controller initiates the program routine and steps the operator through the programming process. The controller 1300 can include a user interface assembly 1302 including a scrolling (e.g., scroll increment 1314, scroll decrement 1316) for advancing through temperature set point choices displayed to the operator on display. The embodiment illustrated in FIG. 13 is a three digit display 1310 but, in other embodiments, can be a display of any number of digits as required by the process application and the parameter limit being programmed. In some embodiments, the user interface 1302 can include an on/off control 1318 for activating the control display.

Figure 17:
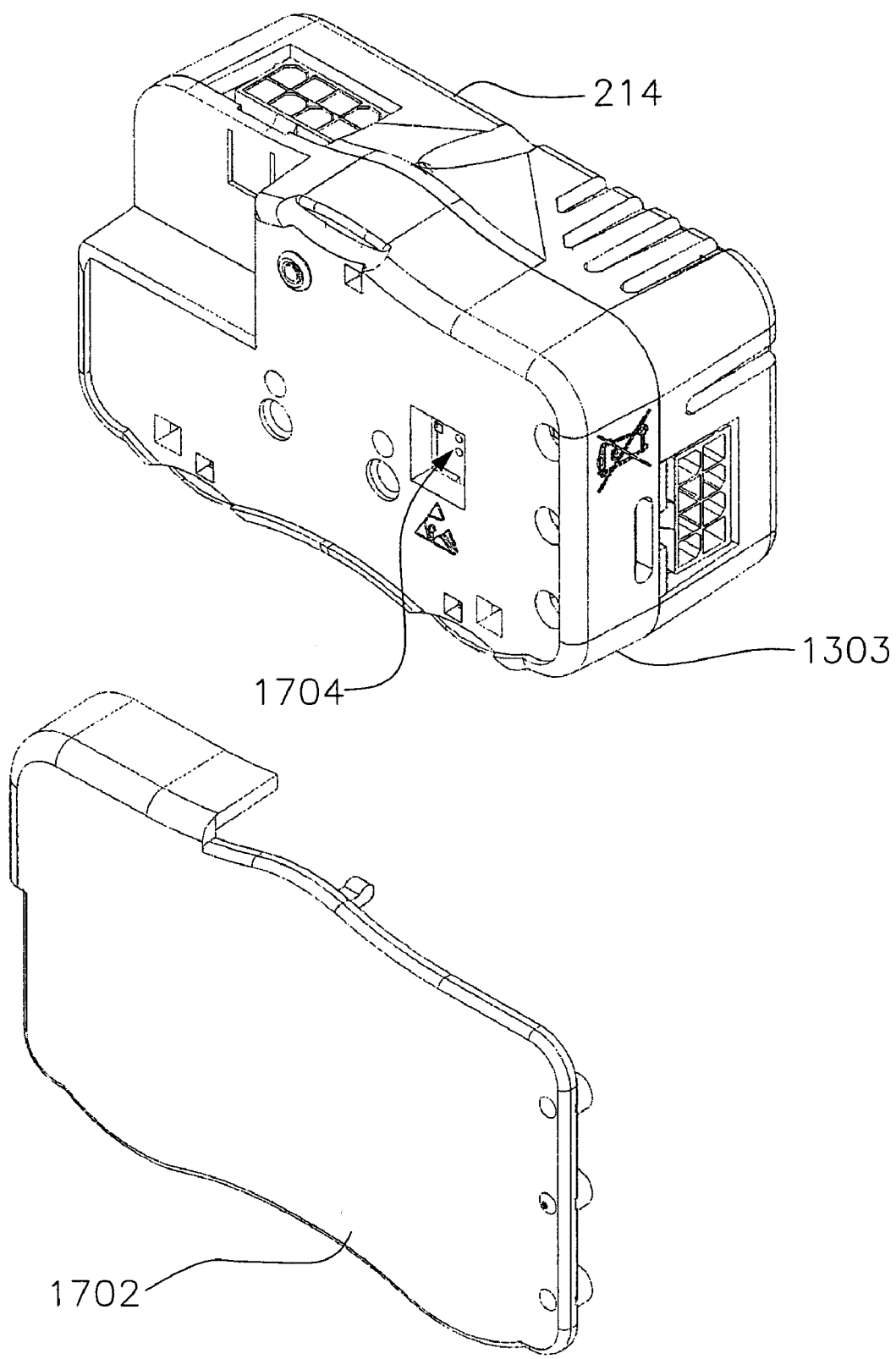
FIG. 17 is an isometric view of another embodiment of the power control system with a cover positioned on a control system housing in the absence of a pluggable user interface according to one exemplary embodiment of the invention.

In another embodiment, e.g., for applications not requiring frequent resetting of thermal set points, the programming module can be used for the initial configuration and thereafter used as a portable programming unit. In this embodiment, a cover 1702 is installed on the controller housing 1304 as shown in FIG. 17 after initial programming set-up. Additionally, in this manner the same user interface assembly 1302 can be used for more than one controller 1300.

In another embodiment, multiple power control systems configured with multiple user interface assemblies can be deployed in a daisy chain fashion using the communications interfaces 1312. In this configuration, a standard communications interface, such as EIA 485, may be used and the monitoring and reprogramming of individual thermal control systems can be programmed from a central operator console position.

Figure 15:
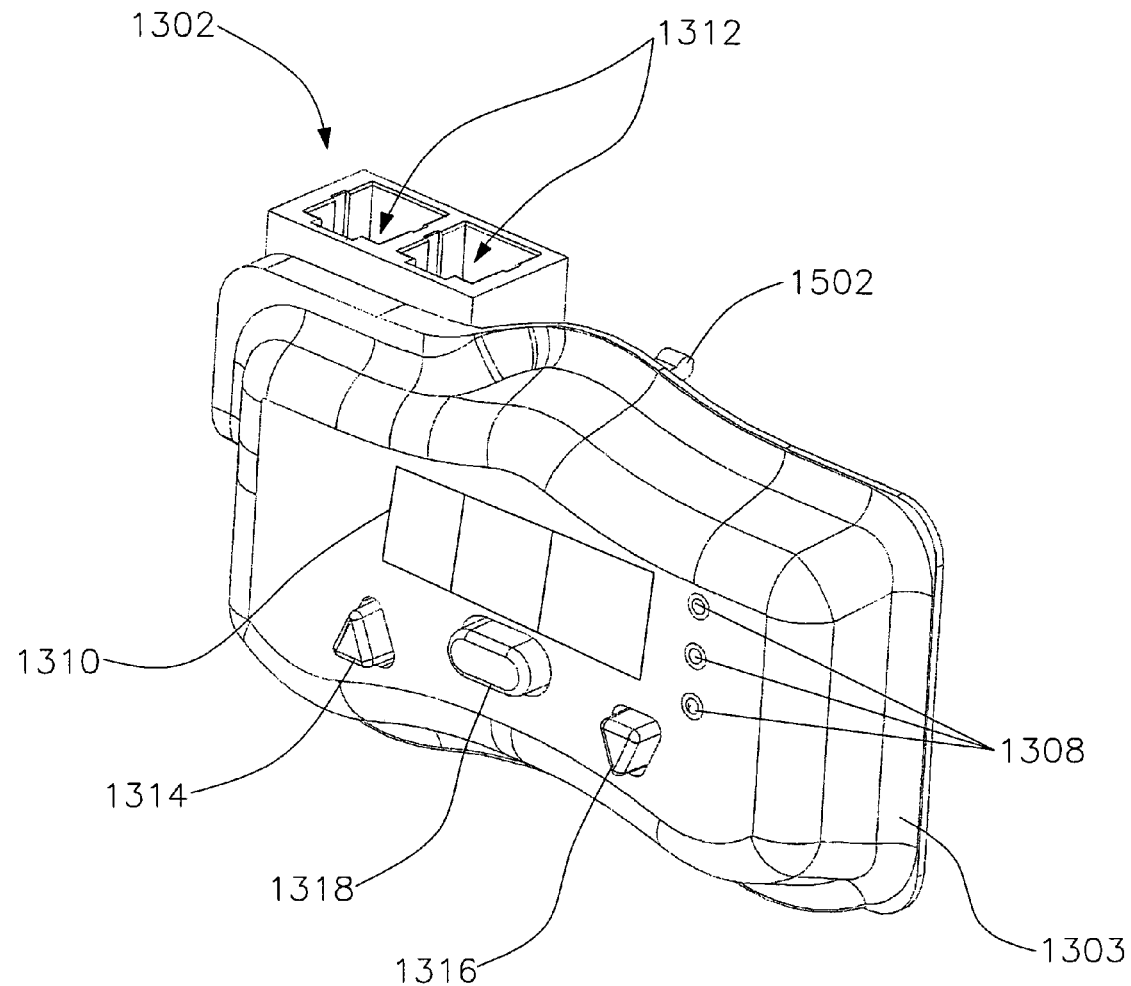
FIG. 15 is an isometric view of a top half housing of a power control system illustrating a releasable user interface module according to one exemplary embodiment of the invention.

Referring now to FIG. 15, the user interface module or assembly 1302 for a power controller includes the user interface housing 1303 that is separate from the controller housing 1304 and that is detachable from the controller housing 1304 and is hot pluggable with the controller 1300. As shown, the user interface housing 1303 includes a display and user input mechanisms as well as supporting electronics (not shown) and connectors for coupling communication wiring connectors. The user interface housing can include one or more tabs 1502 or similarly functional physical coupling features that are configured for physically interlocking the user interface housing to the controller housing 1304.

Figure 16:
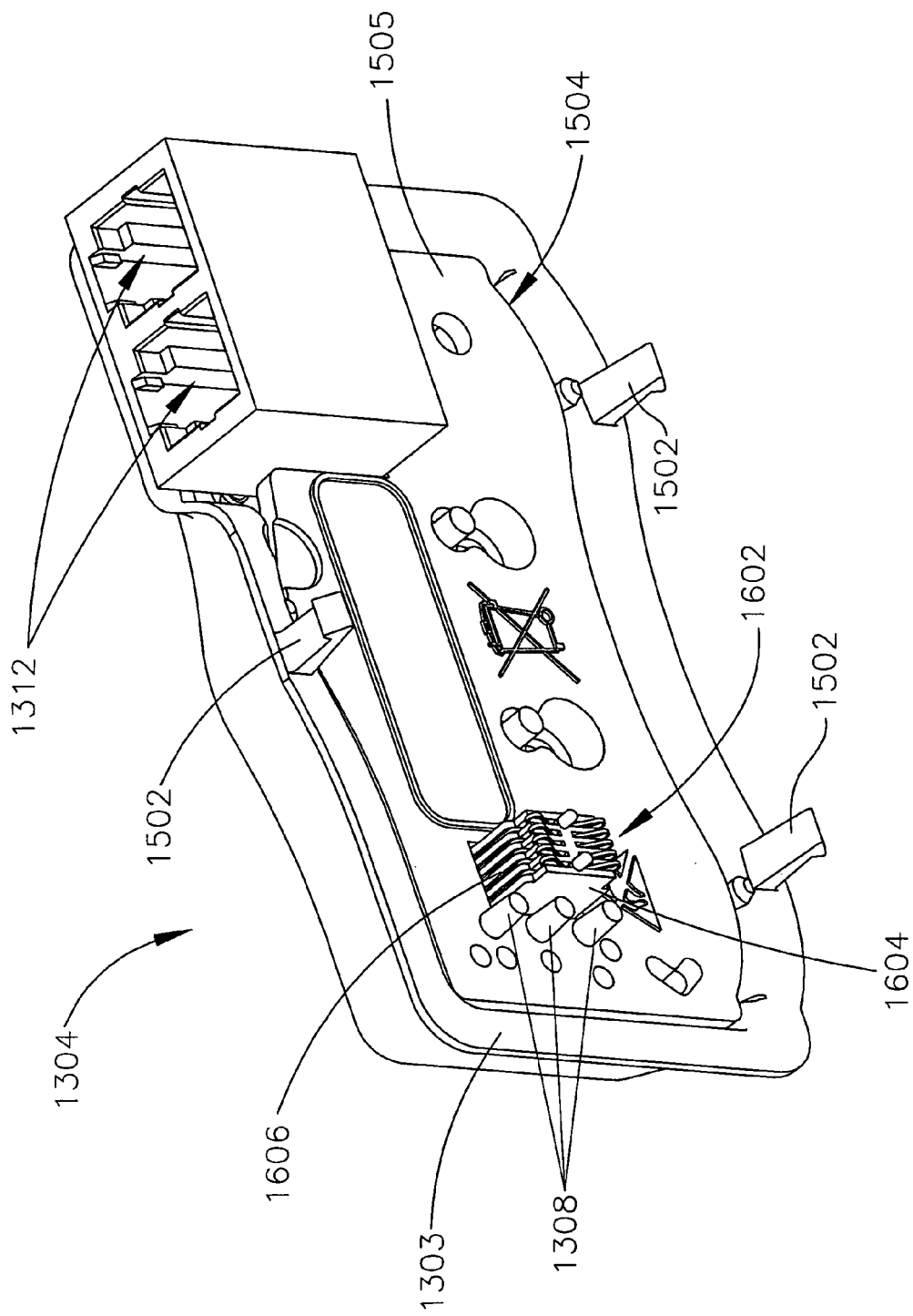
FIG. 16 is a bottom isometric view of a top half housing of a power control system illustrating the three connecting tabs to the lower half, the serial communications interface jack receptacles and the bottom of the printed circuit board hosting the display control electronics according to one exemplary embodiment of the invention.

As shown further in FIG. 16, the user interface assembly 1302 and user interface housing 1303 includes, in this exemplary embodiment, three coupling tabs 1502 configured to physically couple to the controller housing 1304. It should be understood to those skilled in the art that the number of coupling tabs 502 may be more or less than three. Additionally, other types of coupling fasteners or methods can also be utilized to releasably couple the user interface housing 1303 to the controller housing 1304.

As noted above, the user interface assembly 1302 typically includes electronics to support the display and user input mechanism functionality. In FIG. 16, one example of such electronics includes a printed circuit board 1504 that hosts the user interface control circuitry and programming electronics. A human machine interface (HMI) or user interface 1602 is positioned on the under side of the user interface module/assembly 1302 for electrically coupling the user interface and the electronics therein to the controller housing 1304. As shown, the circuit board 1504 can be protected with a protective shield 1505 that can include an EMI shield. This electrical mating can include coupling of power and communications between the user interface and the controller.

As shown in FIG. 16, the HMI/Controller interface 1602 includes a connector 1604 having one or more conductors 1606 configured to mate with a mating electrical connector of the controller base. In other embodiments, the user interface assembly 1302 may include fewer or greater number of connectors 1602 and/or conductors 1606 or may include a wireless or optical communication component or capability.

Figure 18:
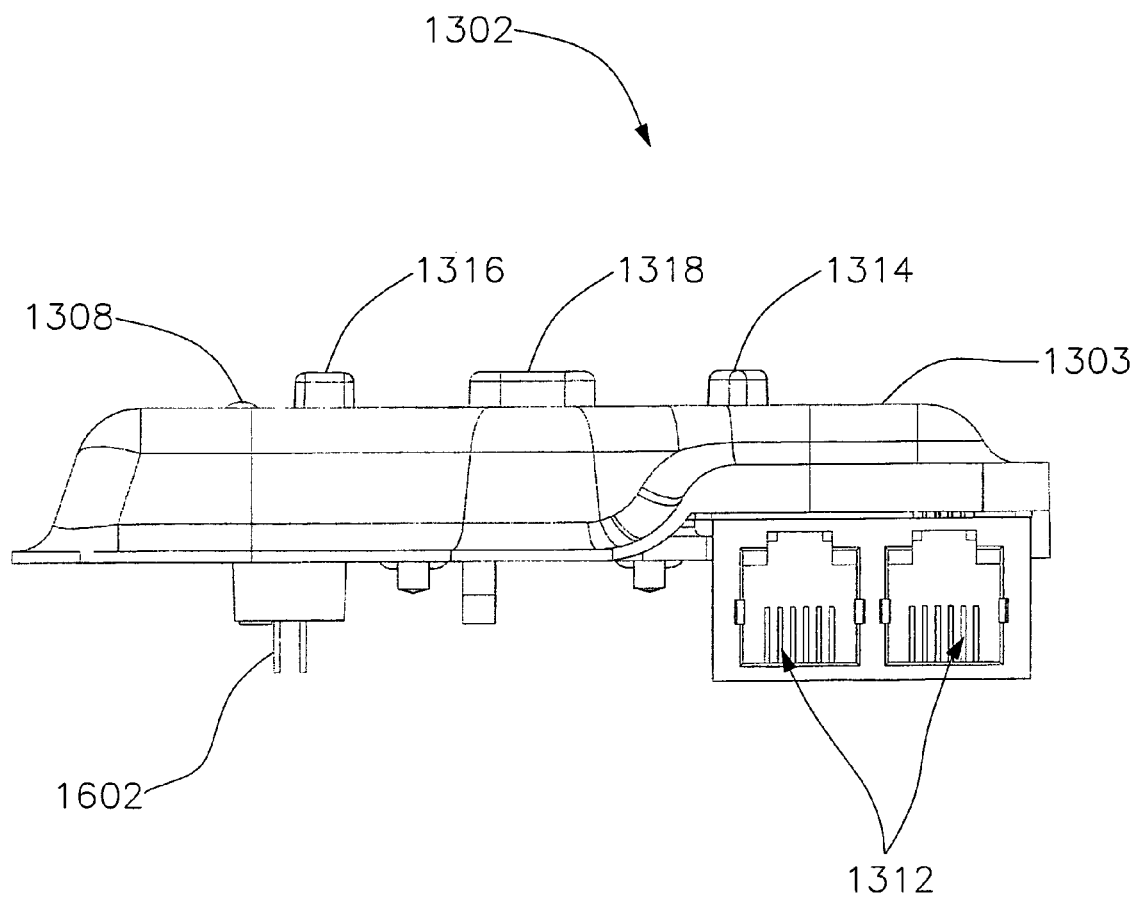
FIG. 18 is a side view of the user interface module showing the communications jacks and the plug interface to a lower half housing according to one embodiment of the invention.

A user interface assembly 1302 illustrated in one embodiment in FIG. 18 can include a display for indicating an operation of the system. The user interface module can also include a data communication interface 1312 for communication with a remote control system.

In some cases, a cover 1702 as shown in FIG. 17 can be provided to mount to the housing to replace the user interface module when the user interface module is not attached to the housing. FIG. 17 also illustrates an interface connector 1704 on the controller 1300 that is configured for receiving a mating connector of a user interface when coupled to the controller 1300 as described above and in FIGS. 13-16.

Controller Housing with Connector Retention

In some embodiments, a housing assembly has a case defining an opening and a securing portion positioned proximate to the opening. A coupler is positioned within the opening and configured for coupling to a connector. The case can include, in some embodiments, a biasing cavity such that the securing portion is defined by a portion of the case between the biasing cavity and the opening. This can also include a flexible portion of the case configured to flex away from the coupler upon coupling of the connector with the coupler and to provide a biasing force against the connector portion when the connector is coupled with the coupler. The case and the securing portion thereof are configured for securing a portion of the connector when coupled with the coupler.

The case can be configured as a single unitary case or housing body or can have one or more case housings. In one embodiment, the case includes a first case housing and a second case housing such that the first case housing and the second case housing can be coupled together to substantially form the case. The opening can be defined by a portion of the first case housing and a portion of the second case housing. In other embodiments, the opening can be substantially defined by the first case housing and the securing portion can be defined by a surface edge of the second case housing. The securing portion can include a flange or similar surface or structure disposed about a portion of the opening such that it can be compressively biased against a portion of the connector such as a flexible locking lever of the connector.

As is well known, the one or more cases and/or housings can be made of metal or a thermoplastic material, such as a polycarbonate. The case can be configured for enclosing any electrical component and can include, in a power controller application of the invention, a power switch and a controller that selectively provide power to a power load, such as a heater. In such embodiments, two or more openings and securing portions can be provided for separately securing more than one connector. For example, this can include an input power connector for receiving power from a power source and an output power connector for providing power to the power load. Additionally, in some embodiments, the case can be configured for enclosing a safety limiter and the one or more connectors can, not only provide input or output power but can also provide one or more sensor signals, such as temperature sensor signals from a temperature sensor associated with the power load.

In some embodiments, as noted above a first coupler can be configured for receiving power from a power source and a second coupler can be configured for providing power to a power load. In such cases, the first coupler and the second coupler are color coded to indicate one as an input coupler and one as an output coupler. For example, the first coupler can be colored black and the second coupler can be colored white for easy user identification. Of course other color or color designations are also considered to be within the present disclosure.

Figure 24:
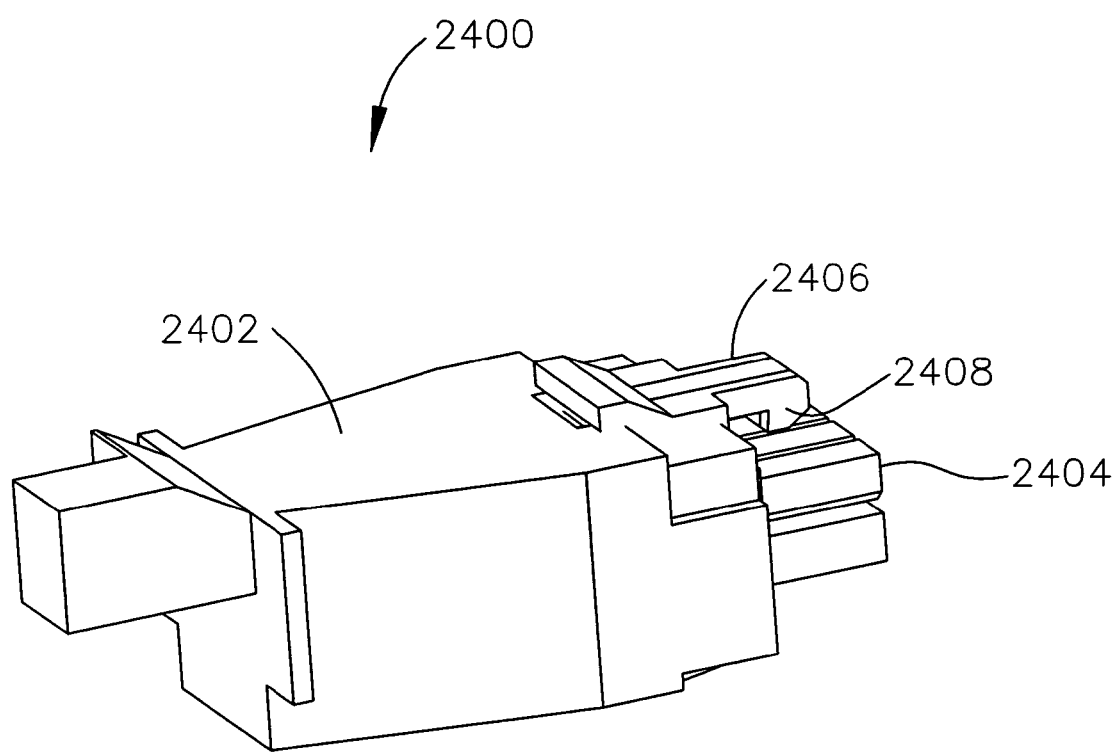
FIG. 24 is an isometric view of a Molex® Minifit Jr.® connector suitable for coupling with the coupler and secured by the controller housing in accordance with some exemplary embodiments of the invention.

In some applications, female/male or male/female standard couplers and connectors can be used rather than customized versions thereof. For instance, in some embodiments, the coupler and/or connector can be compatible with an industry-wide connector such as a Molex® Minifit-Jr.® connector (Molex® and Minifit-Jr.® are registered trademarks of Molex, Inc.) as shown, by way of example, in FIG. 24. This connector 2400 includes a body 2402, a plurality of position connectors 2404 each having an electrical conductor. A connector locking arm 2406 with a securing hook 2408 is configured for engaging an exterior portion of the compatible coupler (not shown in FIG. 24). In this case, the securing portion of the case or housing can include having a cam-like edge or similar feature to allow the connector locking arm 2406 to flex the securing portion during connection and then to provide a continuing bias to the connector locking arm 2406 to secure the connector locking arm 2406 in a locked or hooked position with the coupler, e.g., such that the securing hook 2408 of the connector locking arm 2406 is biased downward.

In some embodiments, a power control system has a power switch for selectively providing at least a portion of power received from a power source to a power load in response to a controller. The coupler is configured for coupling to an external connector and a housing for enclosing the controller and the power switch, the housing defining a coupler opening for external access to the coupler and having a biasing portion located proximate to the coupler opening for providing a biasing force to an engaging portion of a connector when the connector is coupled with the coupler. The biasing portion is configured to secure the connector in the coupled position with the coupler.

According to still another aspect of the invention, a method of operating a power controller having a housing enclosing a power switch for receiving power from a power source and selectively providing at least a portion of the received power to a power load includes inserting a connector into an opening defined by the housing enclosing the power switch and the controller, flexing a securing portion of the housing proximate to the opening during the inserting of the connector into the opening, and coupling the connector to a coupler positioned within the opening. The method also includes securing the securing portion of the housing against a locking portion of the connector following coupling of the connector to the coupler. The method can include compressing the locking portion of the connector, flexing the securing portion of the housing upon the compressing, withdrawing the connector from the opening, and decoupling the connector from the coupler.

Figure 19:
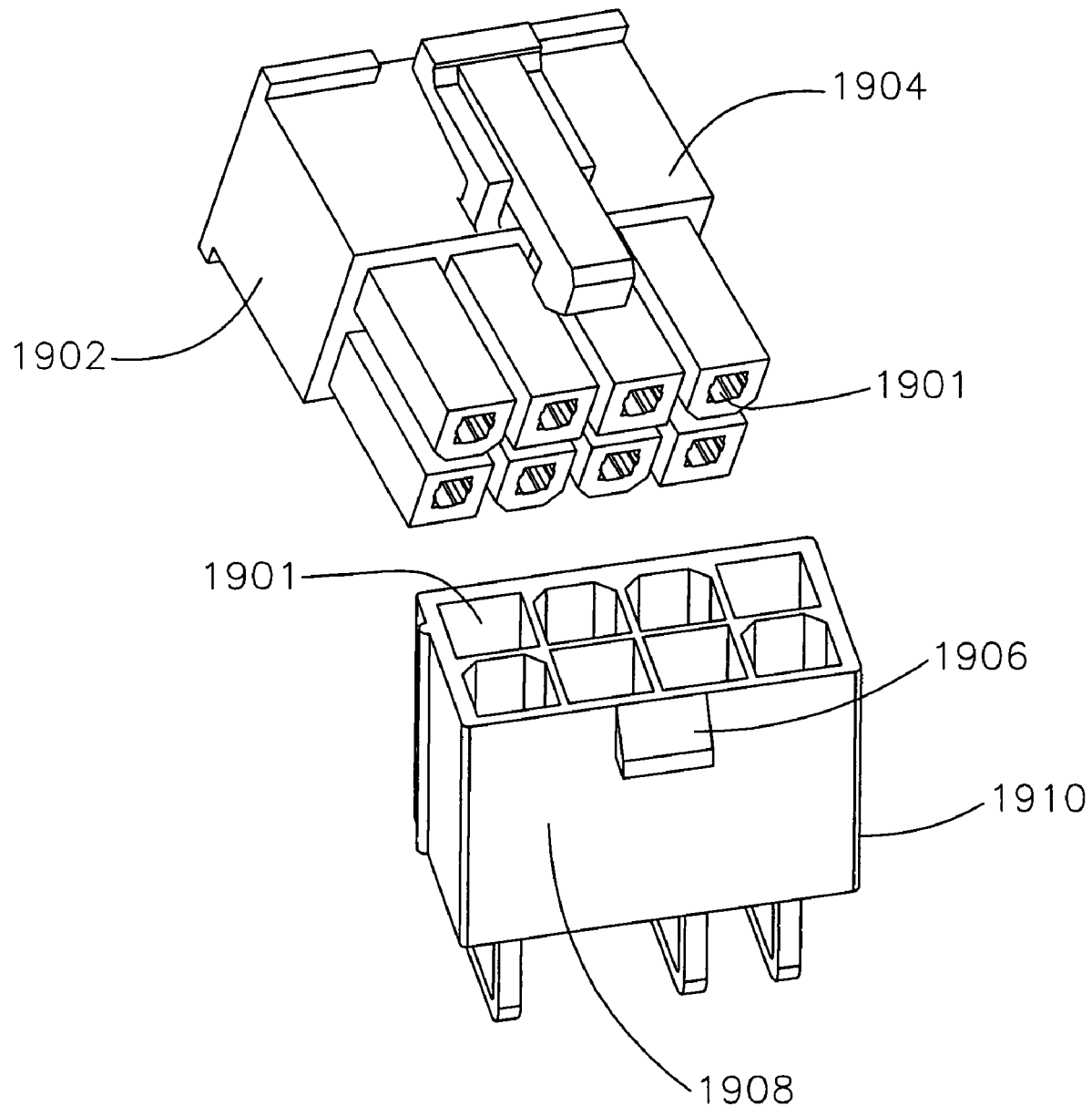
FIG. 19 is an isometric view of a quick-connect connector and the quick-connect receptacle that interfaces the power and control signals between a power load and the power controller according to one exemplary embodiment of the invention.

Another embodiment of the present invention can provide for an interlocking compressive force of the physical design of the connector cavities 706 above the couplers 1306. A male connector and female coupler according to one exemplary embodiment of the invention are illustrated in FIG. 19. However, it should be understood that other combinations, matings and coupling arrangements are also possible. Typically each includes a corresponding number of conductor positions 1901, each providing a mating electrical connectivity upon coupling of the connector to the coupler. The male connector 1902 has a connector locking arm 1904 that slideably lifts over a securing or locking tab 1906 of the coupler 1908 to secure the connector to the coupler 1908. When inserted into the coupler 1908, the connector lever arm 1904 slides over a ramp of the securing tab 1906 with the tab edge of the locking lever arm 1904 latching over the end of the securing tab 1906 to secure the connection. In FIG. 19, a 10-position connector 1902 and coupler 1908 are illustrated. However, it should be noted other quantities of positions 1901 in the connector 1902 and coupler 1908 are also within the scope of the present invention. In one embodiment, the coupler is an 8-position coupler 1908 adapted to receive an 8-position connector 1902.

Figure 20:
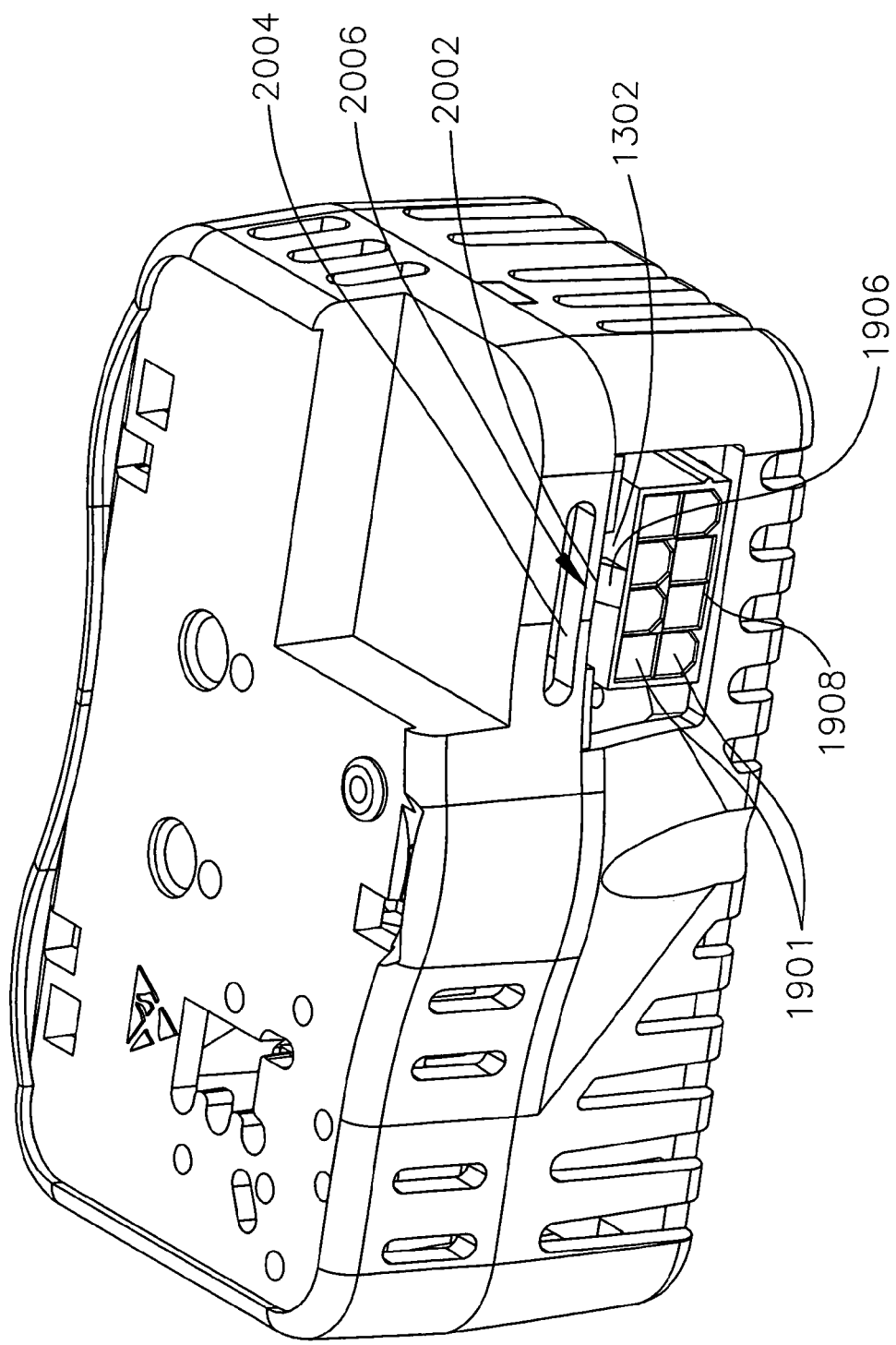
FIG. 20 is an isometric view of the power control system controller illustrating a quick connect receptacle with a locking tab ramp and its associated compressive retaining cam surface that provides a compressive force to a connector lever arm according to one exemplary embodiment of the invention.
Figure 21:
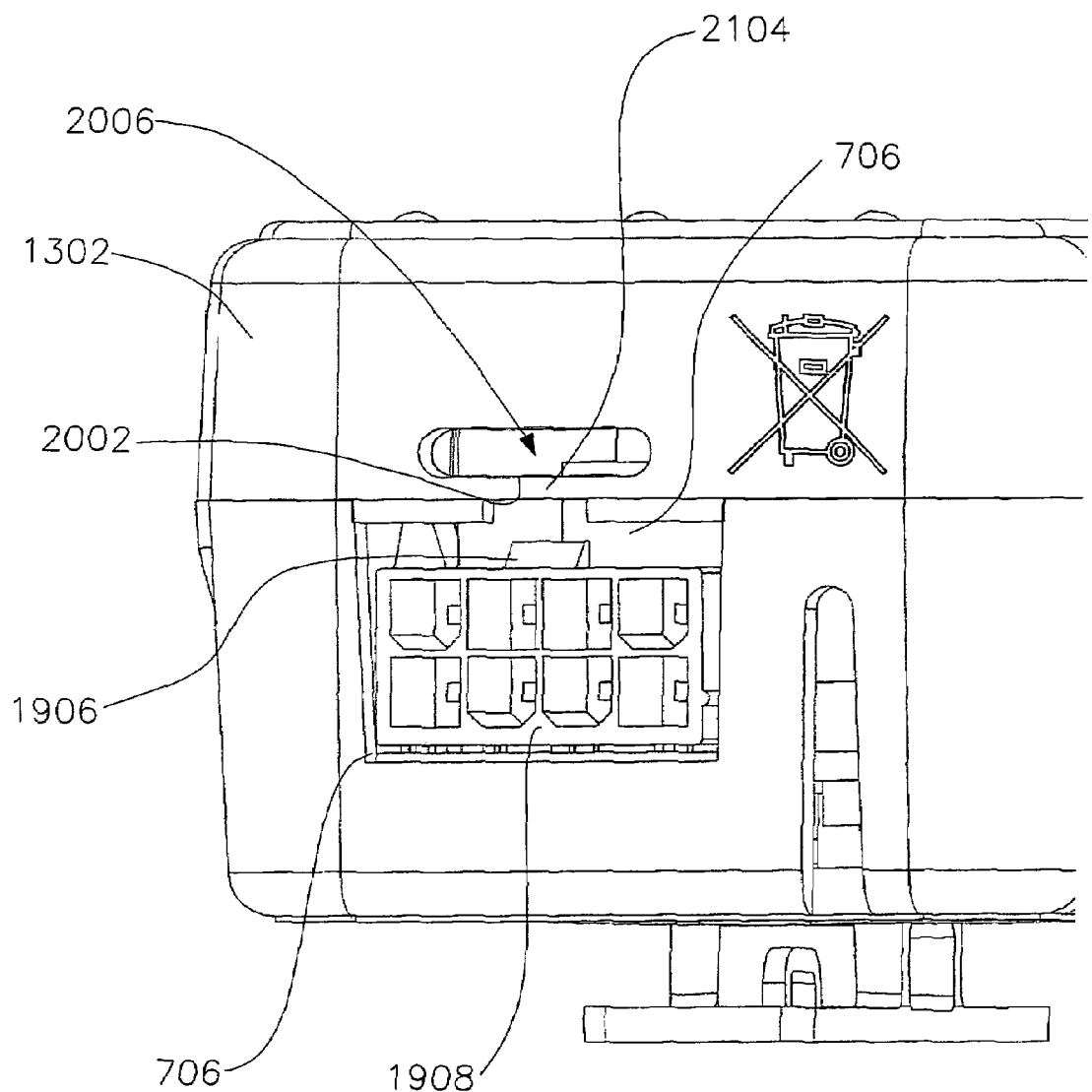
FIG. 21 is another isometric view and embodiment of a compressive retaining cam surface according to one exemplary embodiment of the invention.

Referring now to FIG. 20, to prevent premature disconnection thereby lengthening the cycle life of the number of such connections and disconnections, a retaining slot cam-like surface 2002 can provide a compressive force on the male connector locking arm as illustrated in one embodiment in FIG. 20 and a second compressive cam-surface 2102 embodiment in FIG. 21. Each embodiment of FIGS. 20 and 21 include a biasing cavity, 2006 and 2106, a biasing portion or element 2004 and 2104, and a retaining compression cam surface 2002 and 2102, respectively for retaining a coupler 1908.

Figure 23:
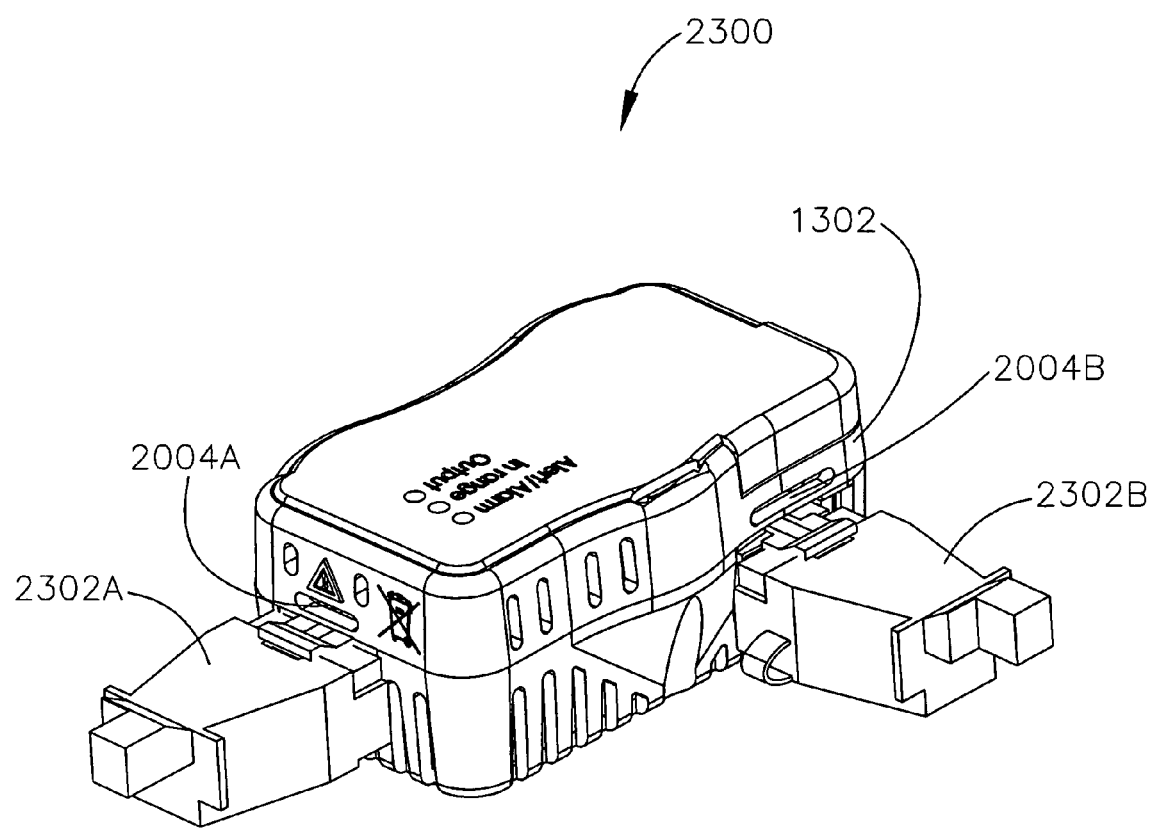
FIG. 23 is an isometric view of a power controller with two connectors coupled to couplers and secured by a securing portion of the controller housing according to one exemplary embodiment of the invention.

Referring now to FIG. 23, one exemplary embodiment of a power controller 2300 has two connectors 2302A and 2302B coupled with two couplers (not shown in FIG. 23) and retained by securing portions 2004A and 2004B, respectively, of the housing 1302.

Figure 25:
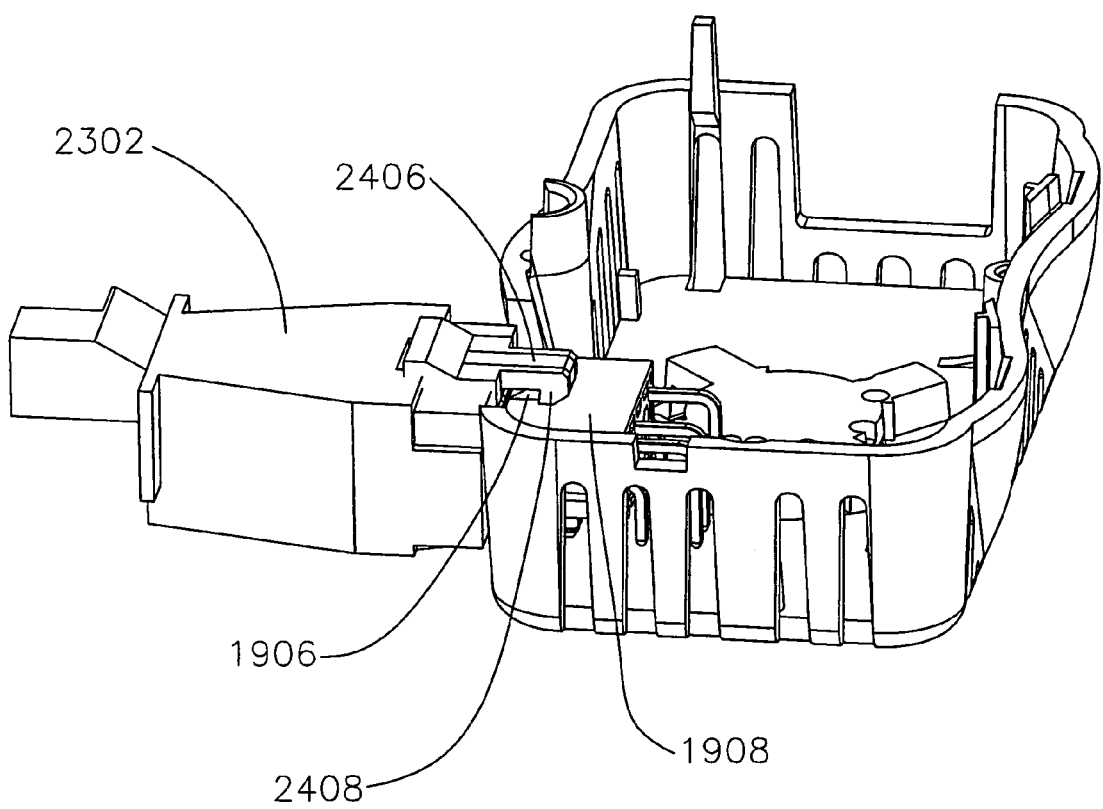
FIG. 25 is a side isometric view of a connector coupled to a coupler of a power controller with a top half of the case removed in accordance with one exemplary embodiment of the invention.
Figure 26:
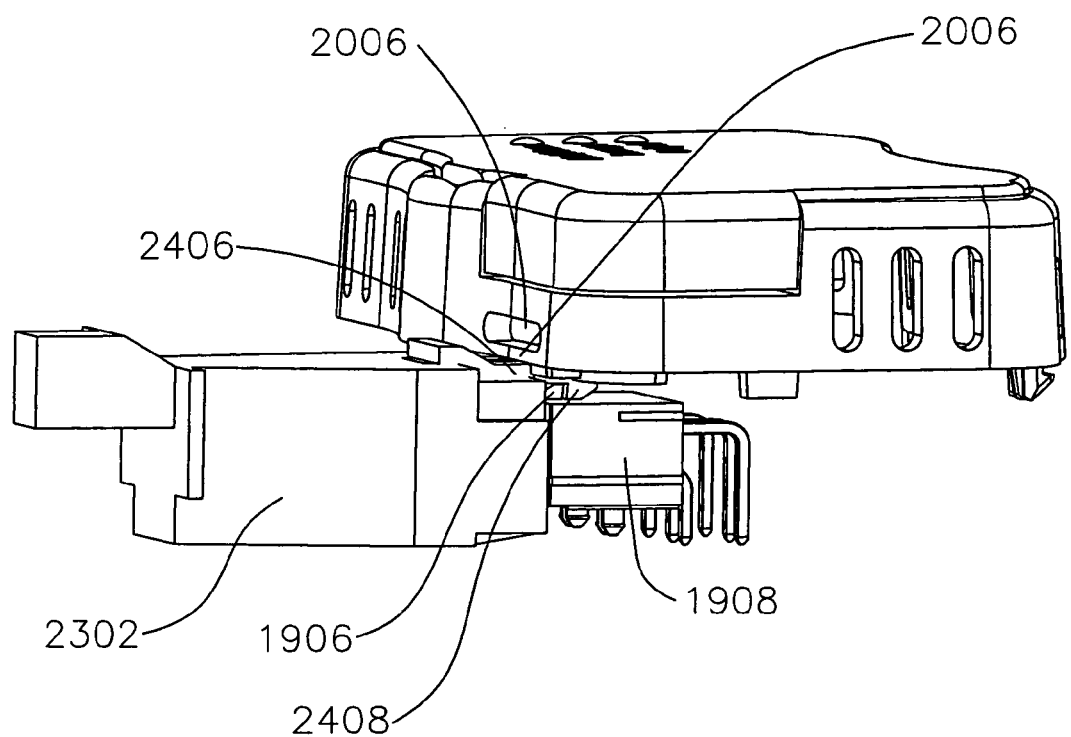
FIG. 26 is a side isometric view of the connector coupled to the coupler of the power controller of FIG. 25 showing the top half of the case but with the lower half removed in accordance with one exemplary embodiment of the invention.

As another example, where the case can include two housing portions, FIGS. 25 and 26 show a disconnected two housing case as shown in FIG. 23, but with a single connector 2302. FIG. 25 illustrates the connector 2302 coupled with the coupler 1908 such that the connector locking arm 2406 has the securing hook 2408 engaged with the securing or locking tab 1906 of the coupler 1908. FIG. 26 illustrates the operation of the securing portion of the connector retainer housing. As shown, the connector 2302 is still coupled to the coupler 1908 with the connector locking arm 2406 having the securing hook 2408 engaged with the securing tab 1906. However, as shown the housing 1302 includes the biasing cavity 2006 that flexed to allow the connector locking arm 2406 to pass during coupling of the connector 2302 with the coupler 1908. The retaining cam surface 2002 continues to bias the connector locking arm 2406 with a downward force after coupling to secure the connector locking arm 2406 and the securing hook 2408 against and behind the locking tab 1906 of the coupler 1908. In this manner, even after the connector locking arm 2406 has lost some of its initial bias or has lost some of its flex, the securing portion of the housing 1302 ensures that the connector locking arm 2406 stays coupled to the coupler 1908 unless user interaction forces the securing portion to flex away from the connector locking arm 2406 and the coupler 1908.

Power Controller Processing System and Environment

Figure 22:
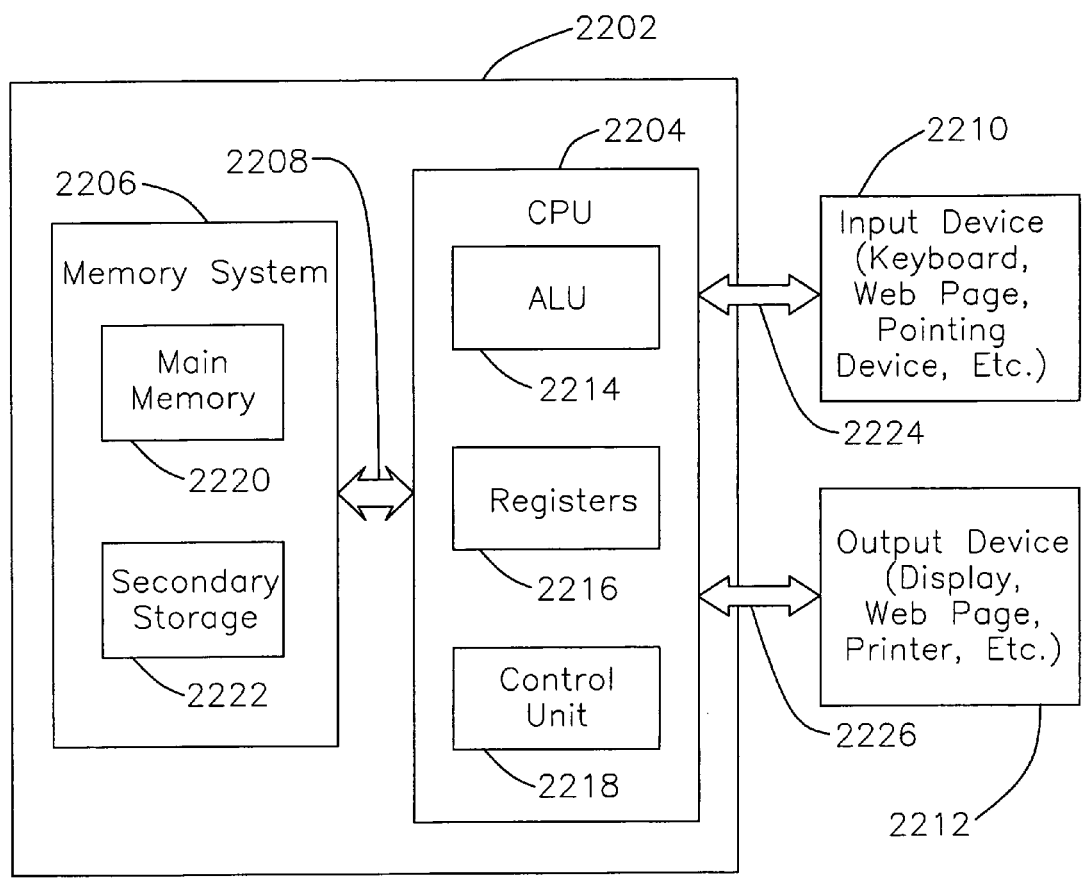
FIG. 22 is a block diagram of a controller system and its various sub-components for a power controller as described herein and as in accordance with one exemplary embodiment of the invention.

Referring now to FIG. 22, a computer/processing system for one or more exemplary embodiments of a controller, limiter, and/or user interface module of the present disclosure can include a computer or processing system 2200 having a computer 2202 that comprises at least one high speed processing unit (CPU) 2204, in conjunction with a memory system 2206 interconnected with at least one bus structure 2208, an input device 2210, and an output device 2212. These elements are interconnected by at least one bus structure 2208.

The illustrated CPU 2204 is of familiar design and includes an arithmetic logic unit (ALU) 2214 for performing computations, a collection of registers 2216 for temporary storage of data and instructions, and a control unit 2218 for controlling operation of the system 2200. Any of a variety of processor, including at least those from Digital Equipment, Sun, MIPS, Freescale (Motorola), NEC, Intel, Cyrix, AMD, HP, and Nexgen, is equally preferred for the CPU 2204. The illustrated embodiment of the invention operates on an operating system designed to be portable to any of these processing platforms.

The memory system 2206 generally includes high-speed main memory 2220 in the form of a medium such as random access memory (RAM) and read only memory (ROM) semiconductor devices, and secondary storage 2222 in the form of long term storage mediums such as floppy disks, hard disks, tape, CD-ROM, flash memory, etc. and other devices that store data using electrical, magnetic, optical or other recording media. The main memory 2220 also can include video display memory for displaying images through a display device. Those skilled in the art will recognize that the memory system 2206 can comprise a variety of alternative components having a variety of storage capacities.

The input device 2210 and output device 2212 are also familiar and can be implemented associated with the local and remote user interfaces as well as a controller, remote operational system and operations system, by way of example. The input device 2210 can comprise a keyboard, a mouse, a physical transducer (e.g. a microphone), etc. and is interconnected to the computer 2202 via an input interface 2224. The output device 2212 can comprise a display, a printer, a transducer (e.g. a speaker), etc, and be interconnected to the computer 2202 via an output interface 2226. Some devices, such as a network adapter or a modem, can be used as input and/or output devices.

As is familiar to those skilled in the art, the computer system 2200 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 2206. As known to those skilled in the art, some of the methods, processes, and/or functions described herein can be implemented as software and stored on various types of computer readable medium as computer executable instructions. In various embodiments of the power control system described by example herein, the controller can include a robust operating and application program having the computer executable instructions for controlling the controller and the controlled devices. Additionally, one or more of the local and remote user interfaces, operations system and remote operations system can include, among other application software programs with computer executable instructions, a thin client application for communicating and interactively operating with one or more controllers as described above by way of example.

In accordance with the practices of persons skilled in the art of computer programming, the present invention is described below with reference to symbolic representations of operations that are performed by the computer system 2200. Such operations are sometimes referred to as being computer-executed. It will be appreciated that the operations which are symbolically represented include the manipulation by the CPU 2204 of electrical signals representing data bits and the maintenance of data bits at memory locations in the memory system 2206, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 2206.

It should be understood to those skilled in the art, that some embodiments of systems or components described herein may have more or fewer computer processing system components and still be within the scope of the present invention.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. A housing assembly comprising:
   a case defining an opening and a securing portion positioned proximate to the opening; and
   a coupler positioned within the opening and configured for coupling to a connector, wherein the case and securing portion are configured for securing a portion of the connector when coupled with the coupler wherein the case defines a biasing cavity and wherein the securing portion is defined by the biasing cavity and the opening, the securing portion biasing a locking lever of the connector into a locked position;
   wherein the securing portion is an integral portion of the case that extends between the biasing cavity and the opening;
   wherein the securing portion includes a flexible portion of the case configured to flex away from the coupler upon coupling of the connector with the coupler and to provide a biasing force against the connector portion when the connector is coupled with the coupler.

2. A housing assembly comprising:
   a case defining an opening and a securing portion positioned proximate to the opening; and
   a coupler positioned within the opening and configured for coupling to a connector, wherein the case and securing portion are configured for securing a portion of the connector when coupled with the coupler wherein the case defines a biasing cavity and wherein the securing portion is defined by the biasing cavity and the opening, the securing portion biasing a locking lever of the connector into a locked position;
   wherein the securing portion is an integral portion of the case that extends between the biasing cavity and the opening;
   wherein the case includes a first case housing and a second case housing, the first case housing and the second case housing are coupled together to substantially form the case, and the opening is defined by a portion of the first case housing and a portion of the second case housing.

3. The assembly of claim 2 wherein the coupler is positioned with the opening defined by the first case housing and wherein the securing portion is defined by a surface edge of the second case housing.

4. A housing assembly comprising:
   a case defining an opening and a securing portion positioned proximate to the opening: and
   a coupler positioned within the opening and configured for coupling to a connector, wherein the case and securing portion are configured for securing a portion of the connector when coupled with the coupler wherein the case defines a biasing cavity and wherein the securing portion is defined by the biasing cavity and the opening, the securing portion biasing a locking lever of the connector into a locked position;
   wherein the securing portion is an integral portion of the case that extends between the biasing cavity and the opening;
   wherein the securing portion includes a flange disposed about a portion of the opening, the flange configured for compressively biasing the locking lever of the connector in the locked position.

5. The assembly of claim 1 wherein the case comprises a thermoplastic material.

6. The assembly of claim 5 wherein the thermoplastic material of the case is a polycarbonate.

7. The assembly of claim 1 wherein the case is configured for enclosing a power switch and a controller for selectively providing power to a power load and wherein the coupler is configured for at least one of receiving power from a power source and providing power to the power load.

8. The assembly of claim 7 wherein the case is configured for enclosing a safety limiter and wherein the coupler is configured for receiving at least one temperature signal from at least one temperature sensor associated with the power load.

9. The assembly of claim 1 wherein the opening is a first opening and the coupler is a first coupler, and wherein the case defines a second opening, further comprising a second coupler positioned within the second opening and configured for coupling to a second connector, wherein the case defines a second securing portion positioned proximate to the second opening and configured for securing a portion of the second connector when coupled with the second coupler.

10. The assembly of claim 9 wherein the case defines a second biasing cavity and wherein the second securing portion is defined by the second biasing cavity and the second opening.

11. The assembly of claim 9 wherein the first coupler is configured for receiving power from a power source via the first connector and wherein the second coupler is configured for providing power to a power load via the second connector.

12. The system of claim 9 wherein the first coupler and the second coupler are color coded to indicate one as an input coupler and one as an output coupler.

13. The system of claim 12 wherein the first coupler is colored black and is configured as an input from a power source and the second coupler is colored white and is configured as an output to a heater and a sensor.

14. The assembly of claim 1 wherein the coupler is compatible with a Molex Minifit-Jr.® connector.

15. The assembly of claim 1 wherein the securing portion includes a flexible cam-like edge providing a securing force to a the locking lever of the coupled connector.

16. The assembly of claim 1 wherein the coupler is a female oriented coupler adapted for receiving a male oriented connector.

17. A power control system having a power switch for selectively providing at least a portion of power received from a power source to a power load in response to a controller, the system comprising:
    a coupler for coupling to an external connector; and
    a housing enclosing the controller and the power switch, the housing defining a coupler opening for external access to the coupler and having a biasing portion located proximate to the coupler opening providing a biasing force to an engaging portion of a connector when the connector is coupled with the coupler, the biasing portion configured to secure the connector in the coupled position with the coupler wherein the power control system includes a safety limiter controlling the providing of power to the power load as a function of a threshold limit and wherein the housing encloses the limiter along with the controller and the power switch;
    wherein the housing includes a flexible cam-like edge providing the biasing force to a connecting lever arm of the coupled connector urging the lever arm into a locked position;
    wherein the flexible cam-like edge is defined by a biasing cavity and the coupler opening and is configured to be in a flexed position and to engage the engaging portion of the connector when the connector is coupled with the coupler.

18. The system of claim 17 wherein the biasing portion includes a flexible portion configured to flex away from the coupler during the coupling of the connector with the coupler and to provide the biasing force against the engaging portion of the connector following coupling of the connector with the coupler.

19. The system of claim 17 wherein the housing defines a biasing cavity, wherein the biasing portion is defined by a portion of the housing positioned between the coupler opening and the biasing cavity.

20. The system of claim 17 wherein the coupler is a first coupler configured for receiving power from a power source, further comprising a second coupler configured for providing power to the power load, wherein the housing is configured with a second coupler opening for external access to the second coupler and having a second biasing portion located proximate to the second coupler opening for providing a second biasing force to an engaging portion of a second connector when the second connector is coupled with the second coupler, the second biasing portion configured to secure the second connector in the coupled position with the second coupler.

21. A method of operating a power controller having a housing enclosing a power switch for receiving power from a power source and selectively providing at least a portion of the received power to a power load, the method comprising:
   inserting a connector into an opening defined by the housing enclosing the power switch and the controller;
   flexing a securing portion of the housing defined by a biasing cavity and the opening during the inserting of the connector into the opening;
   coupling the connector to a coupler positioned within the opening; and
   securing the securing portion of the housing against a locking portion of the connector following coupling of the connector to the coupler thereby retaining the locking portion in a locked position;
   wherein the securing portion is an integral portion of the case that extends between the biasing cavity and the opening.

22. The method of claim 21 wherein securing portion includes biasing the securing portion against the locking portion of the connector.

23. The method of claim 21 wherein the coupler is configured for at least one of receiving power from a power source coupled to the connector and providing power to a power load coupled to the connector.

24. The method of claim 21 wherein the housing encloses a safety limit and wherein the coupler is configured for receiving a temperature signal from a temperature signal associated with the power load.

25. The method of claim 21, further comprising compressing the locking portion of the connector; flexing the securing portion of the housing upon the compressing; withdrawing the connector from the opening; and decoupling the connector from the coupler.

26. The method of claim 21 wherein the connector is a first connector, the coupler is a first coupler, further comprising:
   inserting a second connector into a second opening defined by the housing;
   flexing a second securing portion of the housing proximate to the second opening during the inserting of the second connector into the second opening;
   coupling the second connector to a second coupler positioned within the second opening; and
   securing the second securing portion of the housing against a locking portion of the second connector following coupling of the second connector to the second coupler.

27. The method of claim 26, further comprising compressing the locking portion of the second connector; flexing the second securing portion of the housing upon the compressing; withdrawing the second connector from the second opening; and decoupling the second connector from the second coupler.

* * * * *

UNITED STATES PATENT AND TRADEMARK OFFICE
CERTIFICATE OF CORRECTION

PATENT NO. : 7,652,888 B2 Page 1 of 1
APPLICATION NO. : 11/358849
DATED : January 26, 2010
INVENTOR(S) : Bohlinger et al.

It is certified that error appears in the above-identified patent and that said Letters Patent is hereby corrected as shown below:

Claim 22, Column 28, Line 4, immediately after "securing" delete "portion"

Signed and Sealed this

Thirteenth Day of July, 2010

David J. Kappos
*Director of the United States Patent and Trademark Office*